United States Patent
Cho et al.

(10) Patent No.: US 7,354,167 B2
(45) Date of Patent: Apr. 8, 2008

(54) BEAM FOCUSING AND SCANNING SYSTEM USING MICROMIRROR ARRAY LENS

(75) Inventors: Gyoung Il Cho, Seoul (KR); Tae Hyeon Kim, Taejon (KR); Cheong Soo Seo, Seoul (KR)

(73) Assignees: Angstrom, Inc., Seongnam (KR); Stereo Display, Inc., Anaheim, CA (US)

( * ) Notice: Subject to any disclaimer, the term of this patent is extended or adjusted under 35 U.S.C. 154(b) by 175 days.

(21) Appl. No.: 10/979,568

(22) Filed: Nov. 2, 2004

(65) Prior Publication Data

US 2005/0264867 A1 Dec. 1, 2005

Related U.S. Application Data

(63) Continuation-in-part of application No. 10/934,133, filed on Sep. 3, 2004, now Pat. No. 7,315,503, and a continuation-in-part of application No. 10/914,474, filed on Aug. 9, 2004, and a continuation-in-part of application No. 10/893,039, filed on Jul. 16, 2004, now Pat. No. 7,239,438, and a continuation-in-part of application No. 10/872,241, filed on Jun. 18, 2004, and a continuation-in-part of application No. 10/857, 280, filed on May 28, 2004, now Pat. No. 6,999,226, and a continuation-in-part of application No. 10/857, 714, filed on May 28, 2004, now Pat. No. 7,161,729, and a continuation-in-part of application No. 10/857, 796, filed on May 28, 2004, now Pat. No. 6,934,073, and a continuation-in-part of application No. 10/855, 287, filed on May 27, 2004, now Pat. No. 6,934,072, and a continuation-in-part of application No. 10/855, 715, filed on May 27, 2004, now Pat. No. 7,031,046, and a continuation-in-part of application No. 10/855, 554, filed on May 27, 2004, now Pat. No. 6,970,284.

(51) Int. Cl.
*G02B 5/08* (2006.01)
*G02B 7/182* (2006.01)
*G02B 5/10* (2006.01)
*G02B 26/00* (2006.01)

(52) U.S. Cl. .................. 359/850; 359/851; 359/858; 359/291; 359/292

(58) Field of Classification Search ............... 359/291, 359/290, 292, 297, 298, 853, 850, 851, 854, 359/858, 863, 864
See application file for complete search history.

(56) References Cited

U.S. PATENT DOCUMENTS 2,002,376 A 5/1935 Mannheimer (Continued)

FOREIGN PATENT DOCUMENTS

| JP | 08-043881 | 2/1996 |
|---|---|---|
| JP | 11-069209 | 3/1999 |

OTHER PUBLICATIONS

6/27/2002, filed Sep. 13, 2005, Lee.

*Primary Examiner*—David Spector
*Assistant Examiner*—Brandi Thomas

(57) ABSTRACT

A beam focusing and scanning system using a micromirror array lens (optical system) includes a light source configured to emit light and a micromirror array lens, including at least one micromirror, optically coupled to the light source, configured to reflect the light onto a projection medium (projection plane). The optical system also includes at least one actuating component coupled to the at least one micromirror, configured to move the at least one micromirror to enable the at least one micromirror to focus the light on the projection medium. The advantages of the present invention include high speed variable focusing and scanning, large focal length variation, phase compensation, high reliability and optical efficiency, low power consumption and low cost.

16 Claims, 15 Drawing Sheets

U.S. PATENT DOCUMENTS

| | | | |
|---|---|---|---|
| 4,407,567 A | 10/1983 | Michelet | |
| 4,834,512 A | 5/1989 | Austin | |
| 5,004,319 A | 4/1991 | Smither | |
| 5,212,555 A | 5/1993 | Stoltz | |
| 5,369,433 A | 11/1994 | Baldwin | |
| 5,402,407 A * | 3/1995 | Eguchi et al. | 369/112.29 |
| 5,467,121 A | 11/1995 | Allcock | |
| 5,612,736 A | 3/1997 | Vogeley | |
| 5,696,619 A | 12/1997 | Knipe | |
| 5,881,034 A | 3/1999 | Mano | |
| 5,897,195 A | 4/1999 | Choate | |
| 5,986,811 A | 11/1999 | Wohlstadter | |
| 6,025,951 A | 2/2000 | Swart | |
| 6,028,689 A * | 2/2000 | Michalicek et al. | 359/224 |
| 6,064,423 A | 5/2000 | Geng | |
| 6,084,843 A | 7/2000 | Abe | |
| 6,104,425 A | 8/2000 | Kanno | |
| 6,111,900 A | 8/2000 | Suzudo | |
| 6,123,985 A | 9/2000 | Robinson | |
| 6,282,213 B1 * | 8/2001 | Gutin et al. | 372/20 |
| 6,315,423 B1 | 11/2001 | Yu | |
| 6,329,737 B1 | 12/2001 | Jerman | |
| 6,498,673 B1 | 12/2002 | Frigo | |
| 6,507,366 B1 | 1/2003 | Lee | |
| 6,549,730 B1 | 4/2003 | Hamada | |
| 6,625,342 B2 | 9/2003 | Staple et al. | |
| 6,649,852 B2 | 11/2003 | Chason et al. | |
| 6,650,461 B2 | 11/2003 | Atobe et al. | |
| 6,658,208 B2 | 12/2003 | Watanabe et al. | |
| 6,711,319 B2 | 3/2004 | Hoen | |
| 6,741,384 B1 | 5/2004 | Martin | |
| 6,784,771 B1 | 8/2004 | Fan | |
| 6,833,938 B2 | 12/2004 | Nishioka | |
| 6,885,819 B2 | 4/2005 | Shinohara | |
| 6,900,901 B2 | 5/2005 | Harada | |
| 6,900,922 B2 | 5/2005 | Aubuchon | |
| 6,906,848 B2 | 6/2005 | Aubuchon | |
| 6,906,849 B1 | 6/2005 | Mi | |
| 6,914,712 B2 | 7/2005 | Kurosawa | |
| 6,919,982 B2 | 7/2005 | Nimura et al. | |
| 6,934,072 B1 | 8/2005 | Kim | |
| 6,934,073 B1 | 8/2005 | Kim | |
| 6,958,777 B1 | 10/2005 | Pine | |
| 6,970,284 B1 | 11/2005 | Kim et al. | |
| 6,995,909 B1 | 2/2006 | Hayashi et al. | |
| 6,999,226 B2 | 2/2006 | Kim et al. | |
| 7,023,466 B2 | 4/2006 | Favalora et al. | |
| 7,031,046 B2 | 4/2006 | Kim et al. | |
| 7,046,447 B2 | 5/2006 | Raber | |
| 7,068,416 B2 | 6/2006 | Gim et al. | |
| 7,077,523 B2 | 7/2006 | Seo et al. | |
| 7,161,729 B2 | 1/2007 | Kim et al. | |
| 2002/0018407 A1 | 2/2002 | Komoto | |
| 2002/0102102 A1 | 8/2002 | Watanabe | |
| 2002/0135673 A1 | 9/2002 | Favalora | |
| 2003/0058520 A1 | 3/2003 | Yu | |
| 2003/0071125 A1 * | 4/2003 | Yoo | 235/454 |
| 2003/0174234 A1 | 9/2003 | Kondo | |
| 2003/0184843 A1 | 10/2003 | Moon | |
| 2004/0009683 A1 * | 1/2004 | Hiraoka et al. | 439/75 |
| 2004/0012460 A1 | 1/2004 | Cho | |
| 2004/0021802 A1 | 2/2004 | Yoshino | |
| 2004/0052160 A1 | 3/2004 | Hong | |
| 2004/0246362 A1 | 12/2004 | Konno | |
| 2004/0252958 A1 | 12/2004 | Abu-Ageal | |
| 2005/0024736 A1 | 2/2005 | Bakin | |
| 2005/0057812 A1 | 3/2005 | Raber | |
| 2005/0136663 A1 | 6/2005 | Terence Gan | |
| 2005/0174625 A1 | 8/2005 | Hulber | |
| 2005/0180019 A1 | 8/2005 | Cho | |
| 2005/0212856 A1 | 9/2005 | Temple | |
| 2005/0224695 A1 | 10/2005 | Mushika | |
| 2005/0225884 A1 | 10/2005 | Gim | |
| 2005/0231792 A1 | 10/2005 | Alain | |
| 2005/0264867 A1 | 12/2005 | Cho et al. | |
| 2005/0264870 A1 | 12/2005 | Kim | |
| 2006/0012766 A1 | 1/2006 | Klosner | |
| 2006/0012852 A1 | 1/2006 | Cho | |
| 2006/0028709 A1 | 2/2006 | Cho | |
| 2006/0187524 A1 | 8/2006 | Sandstrom | |
| 2006/0209439 A1 | 9/2006 | Cho | |

* cited by examiner

932

932

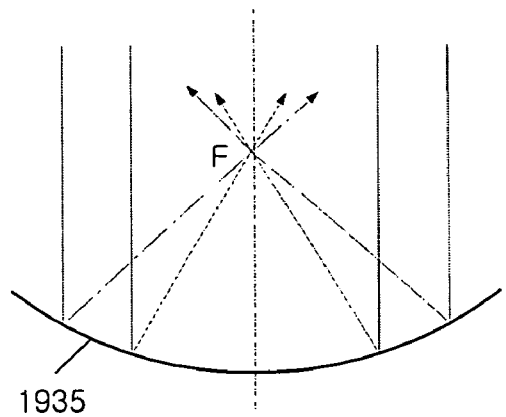
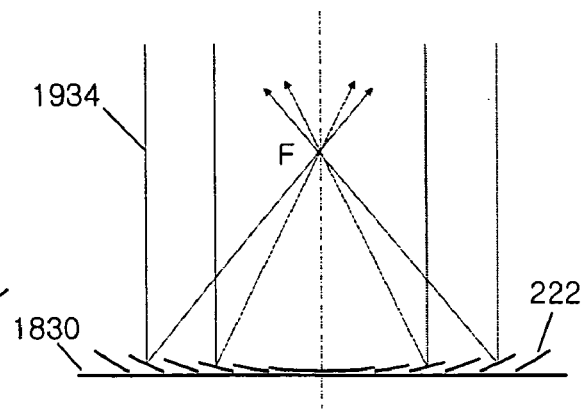
FIG. 19(a)  FIG. 19(b)
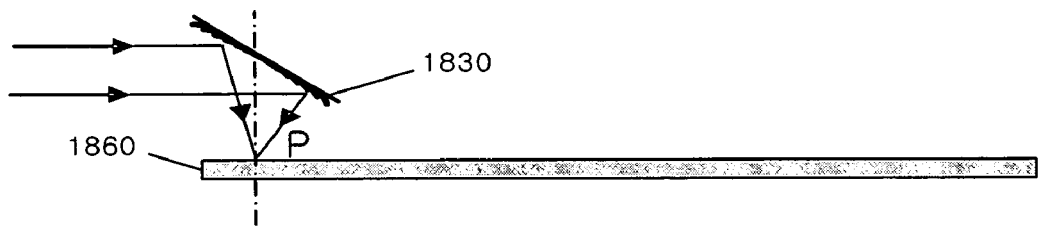
Fig. 20(a)
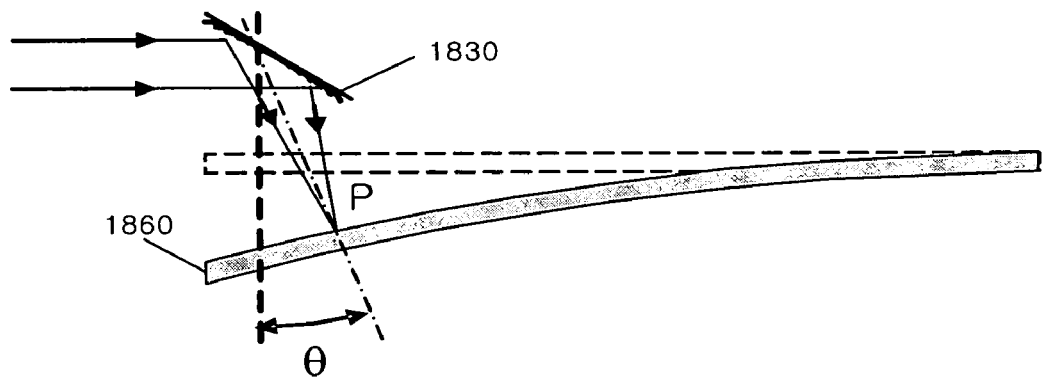
Fig. 20(b)

BEAM FOCUSING AND SCANNING SYSTEM USING MICROMIRROR ARRAY LENS

REFERENCE TO RELATED APPLICATIONS

This application is a continuation-in-part of, and claims priority to U.S. patent application Ser. No. 10/855,554, filed May 27, 2004 now U.S. Pat. No. 6,970,284, U.S. patent application Ser. No. 10/855,715, filed May 27, 2004 now U.S. Pat. No. 7,031,046, U.S. patent application Ser. No. 10/855,287, filed May 27, 2004 now U.S. Pat. No. 6,934,072, U.S. patent application Ser. No. 10/857,796, filed May 28, 2004 now U.S. Pat. No. 6,934,073, U.S. patent application Ser. No. 10/857,714, filed May 28, 2004 now U.S. Pat. No. 7,161,729, U.S. patent application Ser. No. 10/857,280, filed May 28, 2004 now U.S. Pat. No. 6,999,226, U.S. patent application Ser. No. 10/872,241, filed Jun. 18, 2004, U.S. patent application Ser. No. 10/893,039, filed Jul. 16, 2004 now U.S. Pat. No. 7,239,438, U.S. patent application Ser. No. 10/914,474, filed Aug. 9, 2004, and U.S. patent application Ser. No. 10/934,133, filed Sep. 3, 2004, all of which are hereby incorporated by reference.

FIELD OF THE INVENTION

The present invention relates to optical systems in general and more specifically to variable focal length lens systems.

BACKGROUND OF THE INVENTION

An exemplary conventional variable focal length lens system uses two refractive lenses. Such a system requires complex driving mechanisms to control the relative positions of the refractive lenses by macroscopic movements and therefore has a slow response time.

Another attempt at a variable focal length lens is made by changing the shape of the lens; similar to what is found in the human eye by using isotropic liquids. Other approaches include lenses made of an electrically variable refractive index media, enabling creation of either a conventional lens or a gradient index lens by means of a voltage gradient. An electrically variable refractive index allows the focal length of the lenses to be controlled by adjustments to the voltage. One lens of this type is a liquid crystal variable focal length lens, which requires a complex mechanism to control the focal length by modulating the refractive index. This type of lens also has a slow response time, typically on the order of hundreds of milliseconds. Some liquid crystal lenses have response times of tens of milliseconds, but allow for only small focal length variation and yield low focusing efficiency.

Conventional variable focal length lenses also consume large amounts of power, and suffer problems with vibration durability and environmental reliability.

Because of slow response times, as well as other problems listed above, the focusing and scanning capabilities of conventional variable focal length lenses is hindered. Therefore, what is needed is a variable focal length lens system that allows for more efficient focusing and scanning.

SUMMARY OF INVENTION

The present invention addresses the problems of the prior art and provides a beam focusing and scanning system using a micromirror array lens (optical system).

In one embodiment, an optical system includes a light source configured to emit light and a micromirror array lens, including at least one micromirror, optically coupled to the light source, configured to focus the light onto a projection medium (projection plane). The projection medium is optically coupled to the at least one micromirror of the micromirror array lens, and is configured to receive the light reflected by the at least one micromirror. The optical system also includes at least one actuating component coupled to the at least one micromirror, configured to move the at least one micromirror to enable the at least one micromirror to focus the light on the projection medium.

In one aspect of the invention, movement of the at least one micromirror by the at least one actuating component includes translation in one degree of freedom and rotation in two degrees of freedom.

In another aspect, movement of the at least one micromirror by the at least one actuating component is configured to scan the projection medium by traversing the light focused by the micromirror array lens across the projection medium. The scan of the projection medium may be configured to allow data to be recorded from the projection medium.

In another aspect, movement of the at least one micromirror by the at least one actuating component is configured to compensate for light phase aberrations.

In another embodiment, the optical system also includes a control circuitry coupled to the at least one actuating component, configured to control movement of the at least one micromirror by the at least one actuating component. The control circuitry may include, for example, semiconductor microelectronics.

In another embodiment, movement of the at least one micromirror by the at least one actuating component is controlled by electrostatic force, electromagnetic force, or a combination of electrostatic and electromagnetic forces.

In another embodiment, the optical system also includes a read sensor coupled to the micromirror array lens, configured to read data from the projection medium in response to a scan of the projection medium by traversing the light focused by the micromirror array lens across the projection medium.

In another embodiment, a method in an optical system includes emitting light from a light source onto a micromirror and adjusting the position of the micromirror to focus the light onto a projection medium.

In one aspect, the method also includes adjusting the position of the micromirror to compensate for light phase aberrations. In another aspect, the method also includes scanning the projection medium by traversing the focused light across the projection medium. In another aspect, the method also includes recording data from the projection medium in response to the scanning of the projection medium. In another aspect, the method also includes sensing light reflected from the projection medium in response to the focused light and reading data from the projection medium in response to the sensing of the light reflected from the projection medium.

Possible applications of the beam focusing and scanning system (optical system) described herein are two-dimensional image projection devices, printers, optical pick-ups, and scanners. These applications are exemplary only. Other applications are also possible.

The advantages of the present invention include high speed variable focusing and scanning, large focal length variation, phase compensation, high reliability and optical efficiency, low power consumption and low cost.

These and other features of the present invention will be described in more detail below in the detailed description of the invention and in conjunction with the following figures.

BRIEF DESCRIPTION OF THE DRAWINGS

The present invention is illustrated by way of example, and not by way of limitation, in the figures of the accompanying drawings and in which like reference numerals refer to similar elements and in which:

FIGS. 19(a)-19(b) are schematic side views illustrating an analogy between a concave mirror and a micromirror array lens (Frensel reflective lens), according to one embodiment of the present invention;

FIGS. 20(a)-20(b) are schematic side views illustrating an example of the operation of a micromirror array lens to perform phase compensation in compensating for the tilt of an optical disc, according to one embodiment of the present invention;

DETAILED DESCRIPTION OF EMBODIMENTS

The present invention will now be described in detail with reference to a few embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

Improvements upon conventional variable focal length lenses are found in a fast-response micromirror array lens, the details of which are described in J. Boyd and G. Cho, 2003, "Fast-response Variable Focusing Micromirror Array Lens," *Proceeding of SPIE* Vol. 5055: 278-286. This paper is hereby incorporated by reference. The micromirror array lens includes micromirrors and actuating components, and uses a simpler mechanism to control focusing system than in prior art approaches. In the micromirror array lens, the focal length is varied by displacement of each micromirror.

Figure 1:
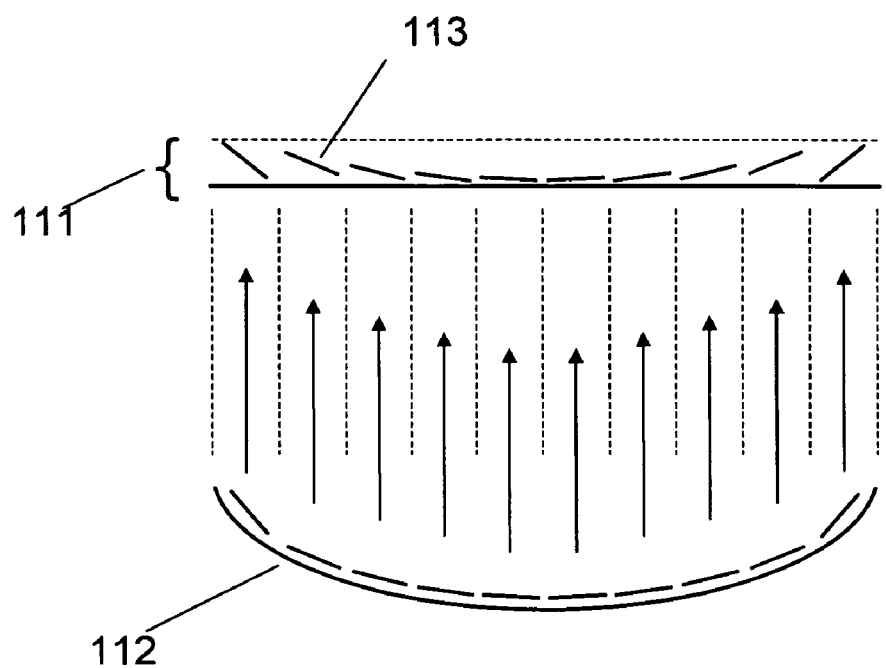
FIG. 1 is a schematic diagram showing a cut-away side view of a micromirror array lens and a conventional reflective lens.

FIG. 1 illustrates the principle of the micromirror array lens 111. To obtain optimal lens performance, two conditions must be satisfied. First, light scattered by one point of an object should converge into one point on the image plane. Second, converging light should have the same phase at the image plane. To satisfy these conditions, the surface shape of a conventional reflective lens 112 is formed to have all lights scattered by one point of an objective to converge into one point on the image plane and have the optical path length of all converging light to be same.

A micromirror array arranged in flat plane can also satisfy these two conditions. Each of the micromirrors 113 rotates to converge the scattered light. Because all micromirrors 113 of the micromirror array lens 111 are arranged in a flat plane as shown in FIG. 1, the optical path length of lights converged by rotation of the micromirrors is different. Even though the optical path length of converging light is different, the same phase condition can be satisfied by adjusting the phase because the phase of light is periodic.

Figure 2:
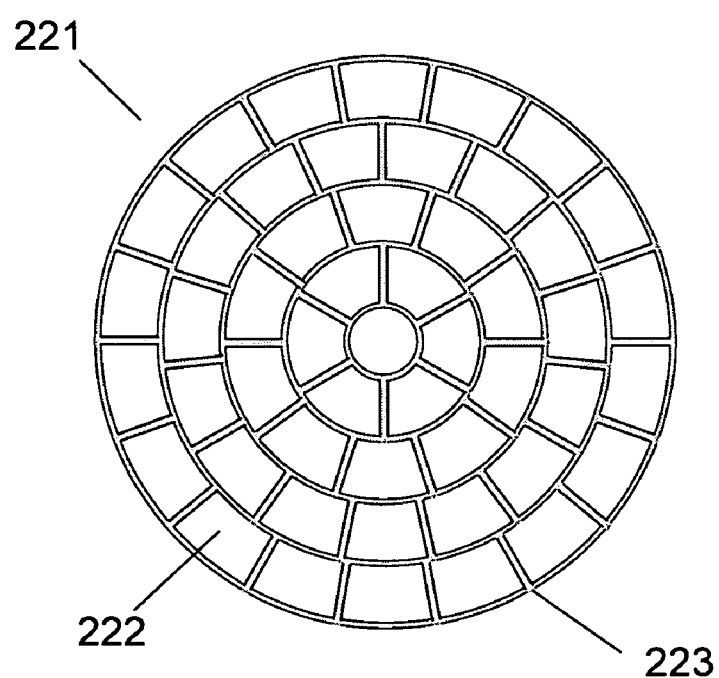
FIG. 2 is an in-plane schematic view showing a micromirror array lens that includes micromirrors and actuating components, according to one embodiment of the present invention.

FIG. 2 illustrates the in-plane view of the micromirror array lens 221. The micromirror 222 has the same function as a mirror. Therefore, the reflective surface of the micromirror 222 is made of metal, metal compound, multi-layered dielectric material, or other materials with high reflectivity. Many known microfabrication processes can make the surface with high reflectivity. Each micromirror 222 is electrostatically and/or electromagnetically controlled by the actuating components 223 as known. In case of an axisymmetric lens, the micromirror array lens 221 has a polar array of the micromirrors 222. Each of the micromirrors 222 has a fan shape to increase an effective reflective area, which increases optical efficiency. The micromirrors are arranged to form one or more concentric circles to form the axisymmetric lens and the micromirrors on the same concentric circle can be controlled by the same electrodes or independently controlled by known semiconductor microelectronics technologies such as MOS or CMOS.

The mechanical structure upholding each reflective micromirror 222 and the actuating components 223 are located under the micromirrors 222 to increase the effective reflective area. Also, electric circuits to operate the micromirrors can be replaced with known semiconductor microelectronics technologies such as MOS and CMOS. Applying the microelectronics circuits under micromirror array, the effective reflective area can be increased by removing necessary area for electrode pads and wires used to supply actuating power.

Figure 3:
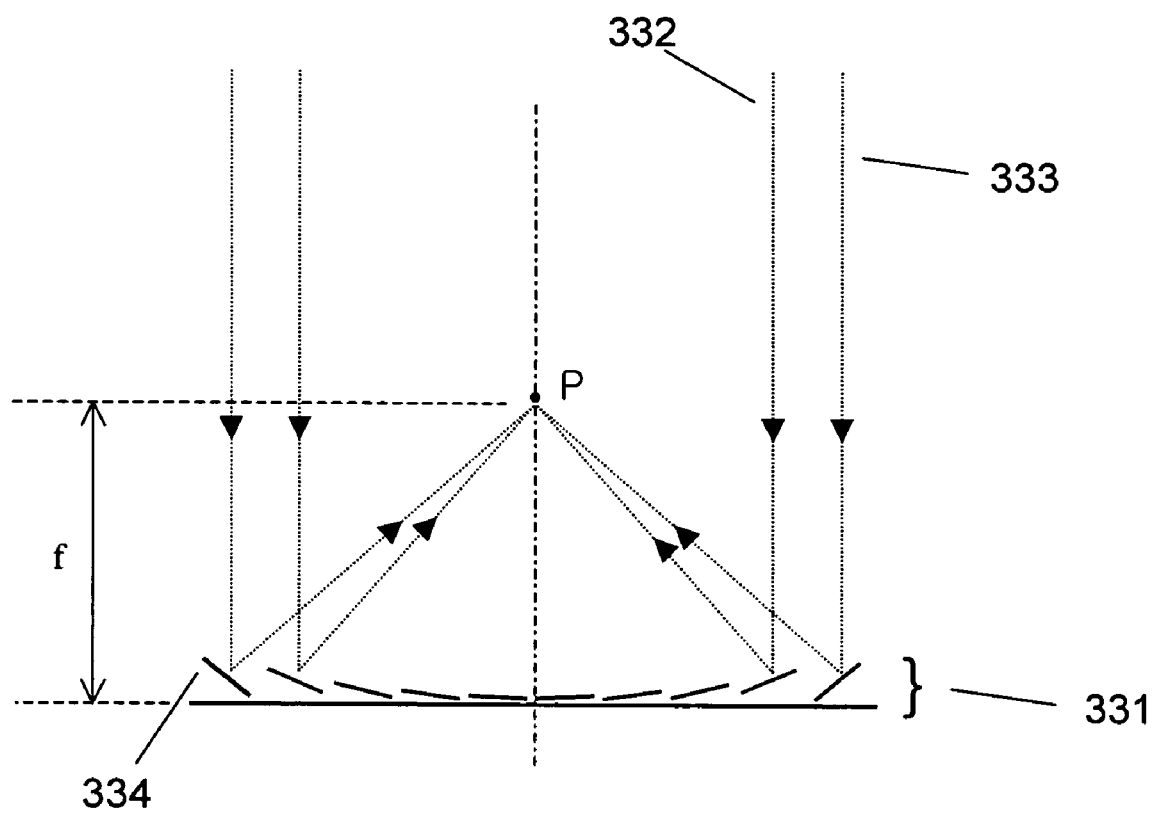
FIG. 3 is a schematic diagram showing a micromirror array in operation as a lens, according to one embodiment of the present invention.

FIG. 3 illustrates how the micromirror array lens 331 images. Arbitrary scattered lights 332, 333 are converged into one point P of the image plane by controlling the positions of the micromirrors 334. The phases of arbitrary light 332, 333 can be adjusted to be same by translating the micromirrors 34. The required translational displacement is at least half of the wavelength of light.

It is desired that each of the micromirrors 334 has a curvature because the ideal shape of a conventional reflective lens 112 has a curvature. If the size of the flat micromirror is small enough, the aberration of the lens comprising flat micromirrors 334 is also small enough. In this case, the micromirror does not need a curvature.

The focal length f of the micromirror array lens 331 is changed by controlling the rotation and the translation of each micromirror 334.

Figure 4:
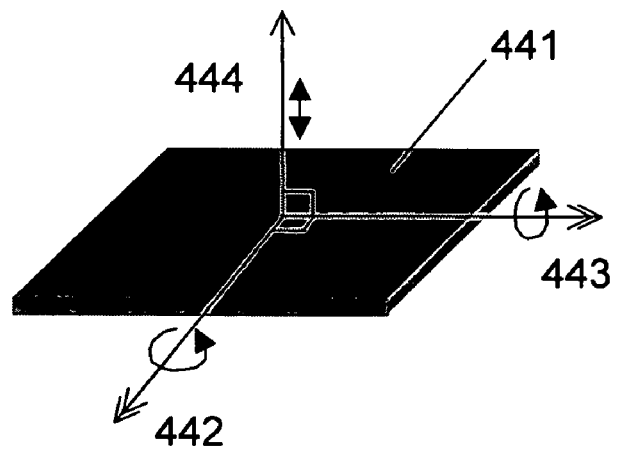
FIG. 4 is a perspective view showing the degrees of freedom of movement of a micromirror, according to one embodiment of the present invention.

FIG. 4 shows two degree of freedom rotations and one degree of freedom translation of the micromirror 441. The array comprising micromirrors 441 with two degree of freedom rotations 442, 443 and one degree of freedom translation 444, which are controlled independently can make a lens with arbitrary shape and/or size. Incident lights can be modulated arbitrarily by forming an arbitrary shape and/or size lens. To do this, it is required that incident lights are deflected to an arbitrary direction by controls of two degree of freedom rotations 442, 443. Independent translation 444 of each micromirror is also required to satisfy the phase condition.

Figure 5A:
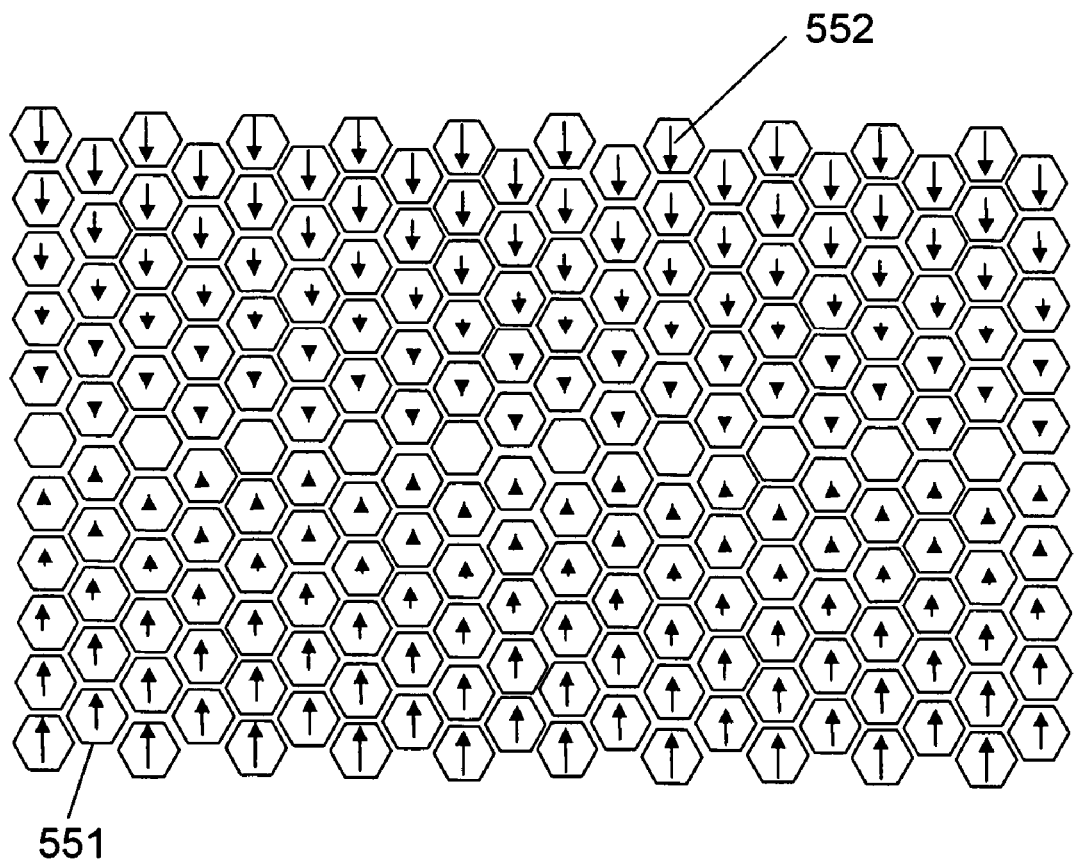
FIGS. 5a-5b are schematic diagrams showing a cylindrical micromirror array lens including hexagonal micromirrors, and a circular micromirror array lens including hexagonal mirrors, respectively, according to one embodiment of the present invention.
Figure 5B:
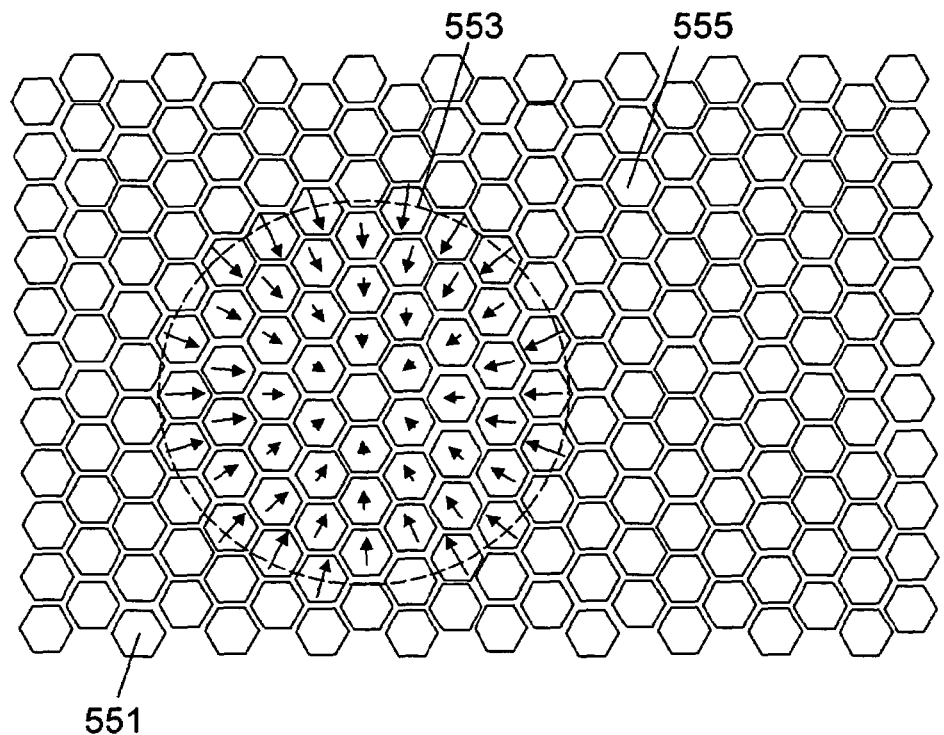
Figure 6:
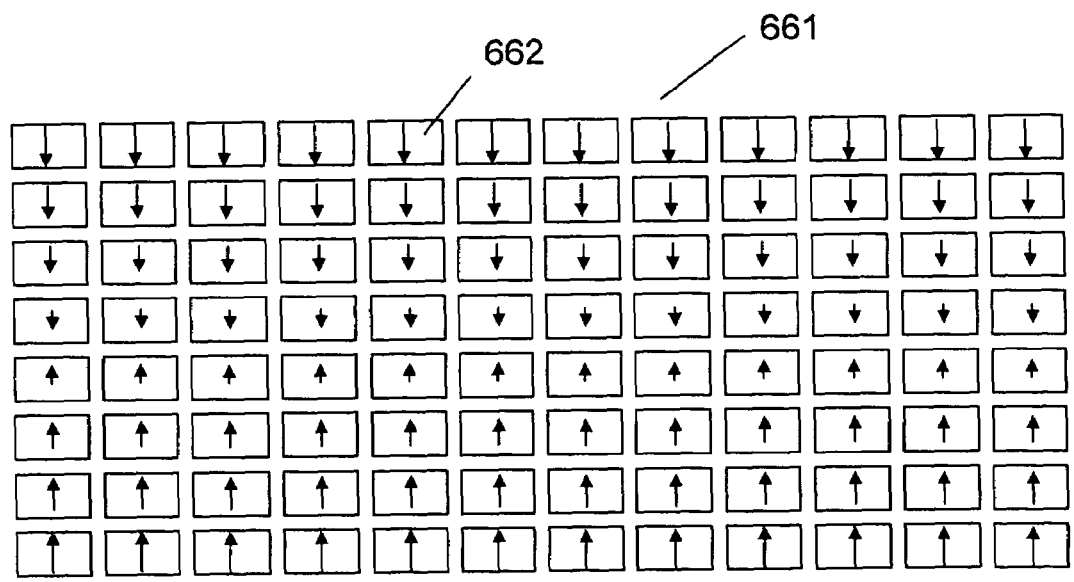
FIG. 6 is a schematic diagram showing a cylindrical micromirror array lens including rectangular micromirrors, according to one embodiment of the present invention.
Figure 7:
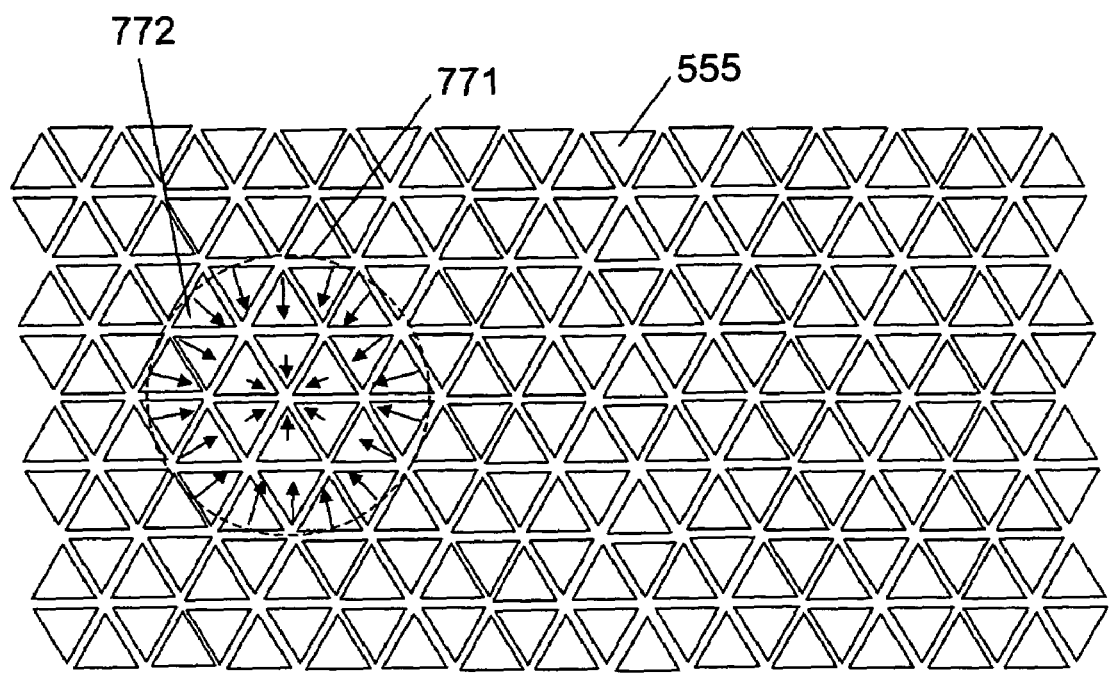
FIG. 7 is a schematic diagram showing a circular micromirror array lens including triangular micromirrors, according to one embodiment of the present invention.

In FIGS. 5a, 5b, 6 and 7, the rotational amount of a micromirror is represented by length of arrow 552 and the profile gradient direction to represent a rotational direction of a micromirror is represented by direction of arrow 552. FIG. 5a shows a variable focal length cylindrical lens comprising hexagonal micromirrors 551. FIG. 5b shows a variable focal length circular lens 553 comprising hexagonal micromirrors 551. Shape, position and size of the variable focal length circular lens 553 can be changed by independent control of micromirrors 551 with two DOF rotations and one DOF translation. In FIGS. 5b and 7, micromirrors 555 which are not elements of the lens are controlled to make lights reflected by the micromirrors 555 not have influence on imaging or focusing.

Even though FIGS. 5a-5b show hexagonal micromirrors 551, fan shape, rectangle, square, and triangle micromirrors array can be used. An array comprising fan shape micromirrors is appropriate to an axisymmetric lens. FIG. 6 shows a variable focal length cylindrical lens 661 comprising rectangular micromirrors 662. An array comprising square or rectangle micromirrors 662 is appropriate to a symmetric lens about one in-plane axis such as cylindrical lens 661. The micromirrors with same rotation are controlled by the same electrode or controlled by known semiconductor microelectronics technologies such as MOS or CMOS independently.

FIG. 7 shows a variable focal length circular lens 771 comprising triangular micromirrors 772. An array comprising triangular micromirrors 772 is appropriate to a lens with arbitrary shape and/or size lens like an array comprising hexagonal micromirrors.

The micromirror array lens is an adaptive optical component because the phase of light can be changed by controlling the translations 444 and rotations 442, 443 of micromirrors independently, referring again to FIG. 4. Referring now to FIGS. 4 and 7, adaptive optical micromirror array lens requires two-dimensional arrays of individually addressable micromirrors. To achieve this, it is necessary to combine the micromirrors with on-chip electronics. In order to do this, wafer-level integration of micromirrors with the known microelectronics circuits is necessary.

The micromirror array lens can correct the phase errors since an adaptive optical component can correct the phase errors of light due to the medium between the object and its image, and/or correct the defects of a lens system that cause its image to deviate from the rules of paraxial imagery. For example, the micromirror array lens can correct the phase error due to optical tilt by adjusting the translations 444 and rotations 442, 443 of micromirrors.

The same phase condition satisfied by the micromirror array lens contains an assumption of monochromatic light. Therefore, to get a color image, the micromirror array lens is controlled to satisfy the same phase condition for each wavelength of Red, Green, and Blue (RGB), respectively, and the imaging system can use bandpass filters to make monochromatic lights with wavelengths of Red, Green, and Blue (RGB).

If a color photoelectric sensor is used as an imaging sensor in the imaging system using a micromirror array lens, a color image can be obtained by processing electrical signals from Red, Green, and Blue (RGB) imaging sensors with or without bandpass filters, which should be synchronized with the control of micromirror array lens. To image Red light scattered from an object, the micromirror array lens is controlled to satisfy the phase condition for Red light. During the operation, Red, Green, and Blue imaging sensors measure the intensity of each Red, Green, and Blue light scattered from an object. Among them, only the intensity of Red light is stored as image data because only Red light is imaged properly. To image each Green or Blue light, the micromirror array lens and each imaging sensor works in the same manner as the process for the Red light. Therefore, the micromirror array lens is synchronized with Red, Green, and Blue imaging sensors. Alternatively, the same phase condition for a color image is satisfied by using the least common multiple of wavelengths of Red, Green, and Blue lights as an effective wavelength for the phase condition. In this case, the micromirror array lens is not necessary to be controlled to satisfy the phase condition for each Red, Green, and Blue light individually. Instead, the phase condition for the least common multiple of the wavelengths should be satisfied.

For the simpler control, the translation of each micromirror is only controlled to satisfy the phase condition for one light among Red, Green, and Blue lights or is not controlled to satisfy the phase condition for any other lights of Red, Green, and Blue. Even though the micromirror array lens cannot satisfy the phase condition due to phase error of lights with multi-wavelength, still the lens can be used as a variable focal length lens with low quality.

Figure 8A:
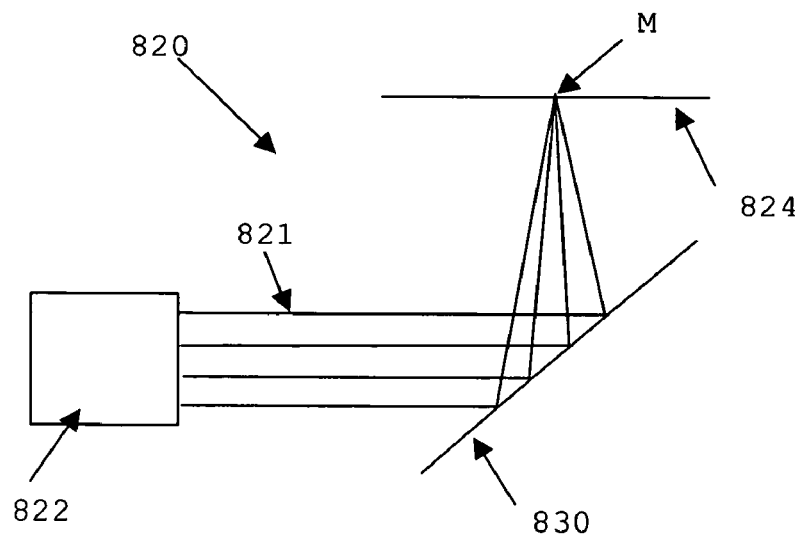
FIGS. 8(a)-8(b) are schematic views of a beam focusing and scanning system using a micromirror array lens, according to two embodiments of the invention.
Figure 8B:
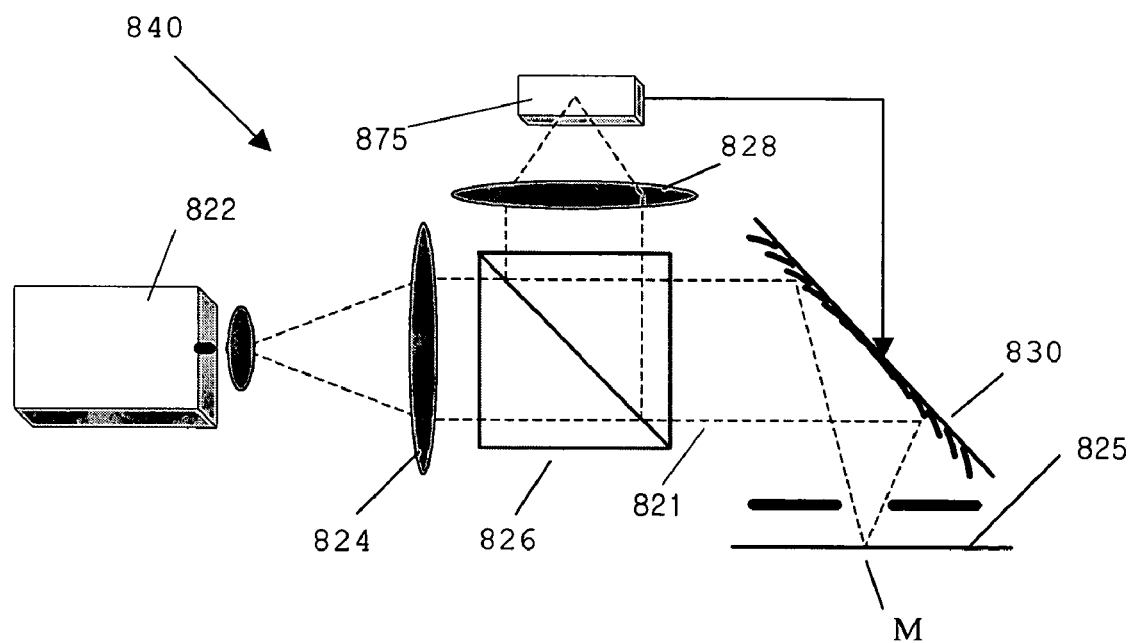

FIGS. 8(a)-8(b) are schematic views of a beam focusing and scanning system using a micromirror array lens (optical system). In FIG. 8(a), an optical system 820 includes a light source 822 configured to emit light 821. The optical system 820 also includes a micromirror array lens 830, including at least one micromirror (see element 222 in FIG. 2), optically coupled to the light source 822, configured to focus the light onto a projection medium 825 (projection plane). The projection medium 825 may be, for example, paper, a television screen, a movie screen, or any other type of projection medium. The projection medium 825 is optically coupled to the micromirror array lens 830, and is configured to receive the light focused by the micromirror array lens 830. The optical system 820 also includes at least one actuating component (see element 223 in FIG. 2) coupled to the at least one micromirror of the micromirror array lens 830, configured to move the at least one micromirror to enable the at least one micromirror to focus the light on the projection medium 825.

In one aspect of the invention, movement of the at least one micromirror by the at least one actuating component includes translation in one degree of freedom and rotation in two degrees of freedom, as described further with reference to FIG. 4.

In another aspect, movement of the at least one micromirror by the at least one actuating component is configured to scan the projection medium by traversing the light focused by the micromirror array lens across the projection medium 825. The scan of the projection medium 825 may be configured to allow data to be recorded to the projection medium 825.

In another aspect, movement of the at least one micromirror by the at least one actuating component is configured to compensate for light phase aberrations, as described further with reference to FIGS. 20(a)-20(b).

In another embodiment, the optical system 820 also includes a control circuitry coupled to the at least one actuating component, configured to control movement of the at least one micromirror by the at least one actuating component. The control circuitry may include, for example, semiconductor microelectronics. (refer to FIG. 2)

In another embodiment, movement of the at least one micromirror by the at least one actuating component is controlled by electrostatic force, electromagnetic force, or a combination of electrostatic and electromagnetic forces (refer to FIG. 2).

Referring now to FIG. 8(b), the optical system 840 also includes a beam splitter 826 (refer to 1826 in FIG. 18), optically coupled to the light source 822 configured to split the light rays 821. The light source 822 emits light that passes through a first optical lens 824 (refer to 1824 in FIG. 18). The first optical lens creates a collimated light beam which is passed to the beam splitter 1826. A second optical lens 828 (refer to 1828 in FIG. 18) receives portion of the light rays 821 from the beam splitter 826 and focuses the light rays onto a read sensor 875. The read sensor 875 is optically coupled to the micromirror array lens 830 and is configured to read data from the projection medium 825 in response to a scan of the projection medium by traversing the light focused by the micromirror array lens 830 across the projection medium 825. As in the embodiment described with respect to FIG. 8(a), movement of the at least one micromirror by the at least one actuating component may be configured to compensate for light phase aberrations, as described further with reference to FIGS. 20(a)-20(b).

Figure 8C:
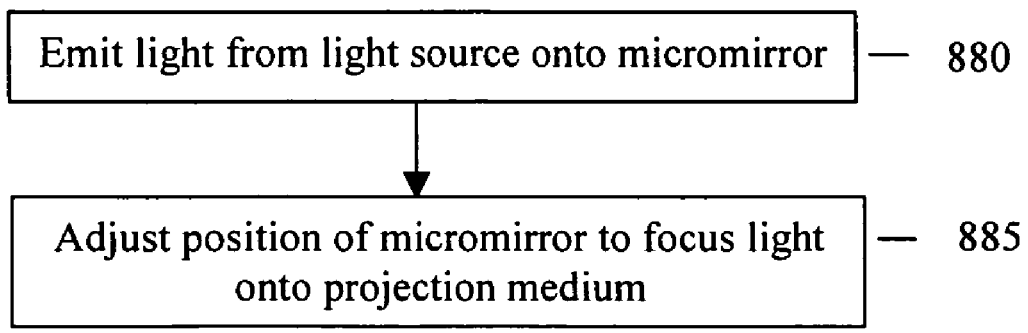
FIGS. 8(c)-8(d) are flow diagrams of methods in a beam focusing and scanning system using a micromirror array lens, according to various embodiments of the invention.

FIG. 8(c) is a flow diagram of a method in a beam focusing and scanning system using a micromirror array lens. At step 880, light is emitted from a light source onto a micromirror. At step 885, the position of the micromirror is adjusted to focus the light onto a projection medium.

Figure 8D:
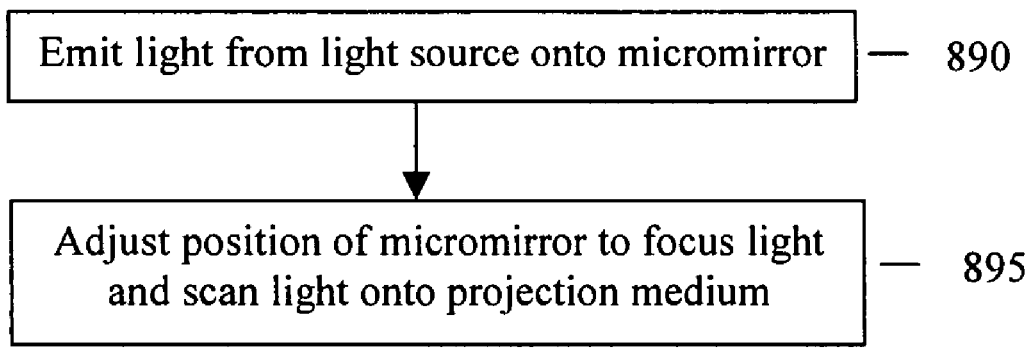

FIG. 8(d) is a flow diagram of a method in a beam focusing and scanning system using a micromirror array lens. At step 890, light is emitted from a light source onto a micromirror. At step 895, the position of the micromirror is adjusted to focus and scan the light onto a projection medium.

In one aspect, the method also includes adjusting the position of the micromirror to compensate for light phase aberrations. In another aspect, the method also includes scanning the projection medium by traversing the light focused by the micromirror array lens across the projection medium. In another aspect, the method also includes recording data to the projection medium in response to the scanning of the projection medium. In another aspect, the method also includes sensing light reflected from the projection medium in response to the light focused by the micromirror array lens and reading data from the projection medium in response to the sensing of the light reflected from the projection medium.

Possible applications of the beam focusing and scanning system described with reference to FIGS. 8(a)-8(c) are two-dimensional image projection devices, printers, optical pickups, and scanners. These applications are exemplary only. Other applications are also possible.

In one embodiment of the invention there is provided a two-dimensional image projection device comprising an array of micromirror array lenses. Each micromirror array lens comprises a plurality of micromirrors, whose configurations may be adjusted to change the focal length, optical axis, lens size, the number of lenses, shape of lens, and others of the micromirror array lens. When applied to conventional two-dimensional display devices, the array of micromirror array lenses greatly improve the brightness of the projected image and the power consumption of the display device by increasing light efficiency.

Referring again to FIG. 8(a), the optical system 820 may be applied in a two-dimensional image projection device comprising a light source 822, a lens array 830, and a projection plane 825. The light source 822 may be any conventional light source, such as a metal halide with a color wheel, a light emitted diode, a three (Red, Green, Blue) laser diode, or any other suitable light source. The light source generates Red, Green, and Blue ("RGB") light 821, which is reflected by the lens array 830 according to the image data, and focused onto the projection plane 825, where the resulting image is displayed.

Figure 9:
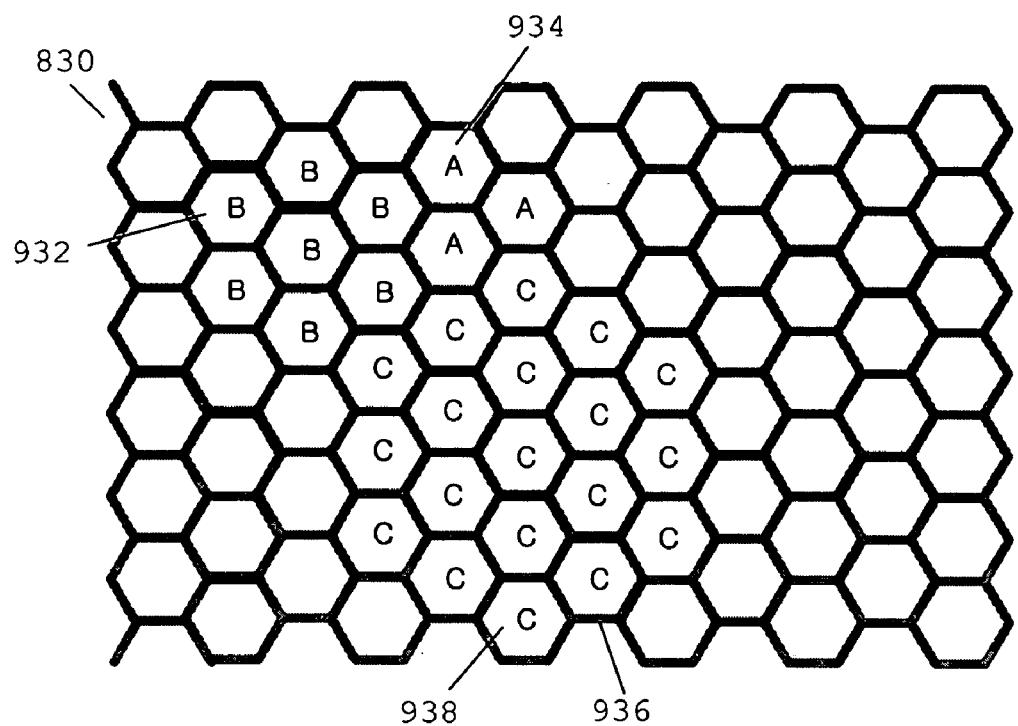
FIG. 9 is a partial top view of a lens array, according to one embodiment of the present invention.

Referring now to FIG. 9, the lens array 830 comprises a planar array of micromirror array lenses 932, 934, and 936. Each micromirror array lens comprises a plurality of micromirrors 938. The micromirrors 938 have the same function as a mirror and comprise a reflective surface made of metal, metal compound, or other materials with reflectivity. Many known microfabrication processes can be used to fabricate a surface having high reflectivity. The micromirrors are individually controlled by actuating components that rotate and translate the micromirrors. The micromirrors are preferably parabolic in cross-section. This parabolic construction increases the focusing efficiency of the micromirror array lens, as discussed in further detail below.

The lens array 830 may comprise a series of micromirror array lenses 932, 934, and 936 arranged to form a substantially rectangular array. The basic configuration and operational principle of such a lens array is described in and U.S. patent application Ser. No. 10/857,714 (filed May, 28, 2004), the entire disclosure of which is incorporated herein by reference.

Figures 10A, 10B:
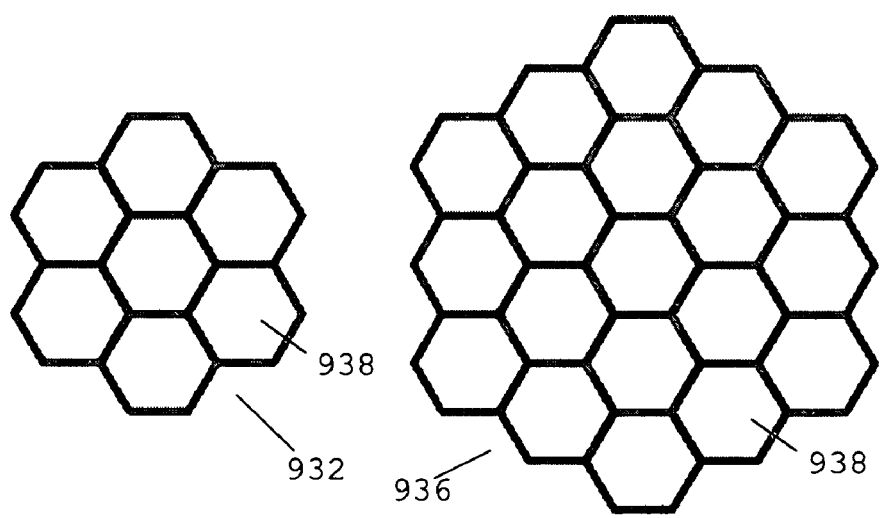
FIGS. 10(a)-10(b) are top views of micromirror array lenses included in the lens array of FIG. 9, according to one embodiment of the present invention.

As shown in FIGS. 10(a) and 10(b), each micromirror array lens comprise an arbitrary number of micromirrors 938 that may vary in size and shape. However, it is preferred that the micromirrors comprise a hexagonal, rectangular, and/or square shape. These shapes enable the micromirrors to be easily fabricated and controlled.

In other embodiments, a cylindrical lens array or mixed lens array comprising cylindrical and/or circular lenses may be constructed.

Figure 11:
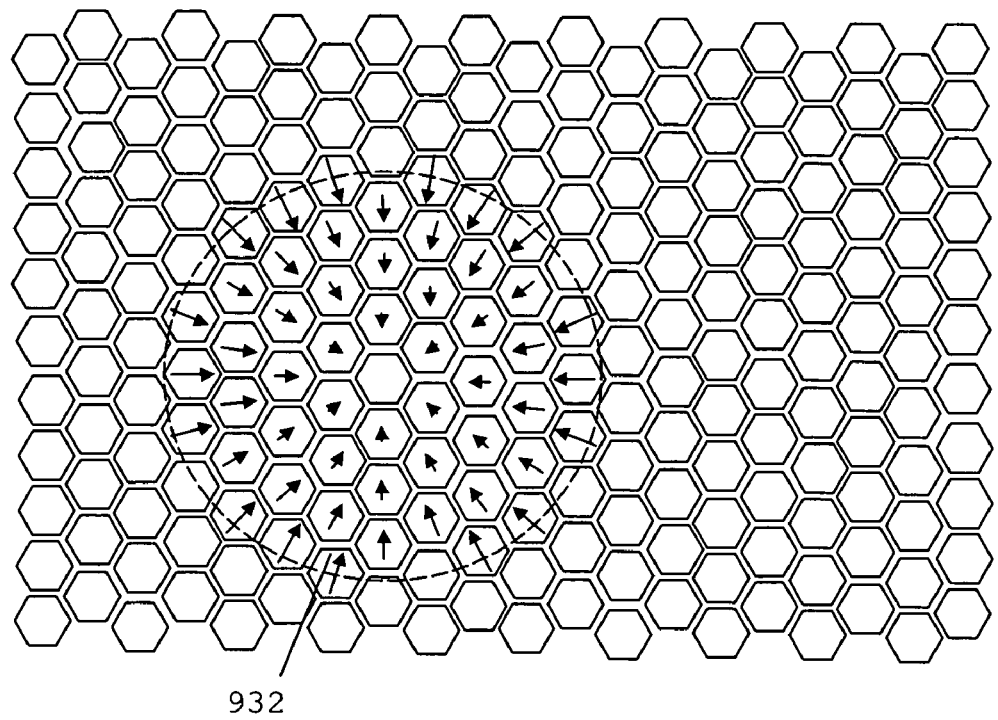
FIG. 11 is a top view of a lens array including a micromirror array lens at a first point in time, according to one embodiment of the present invention.
Figure 12:
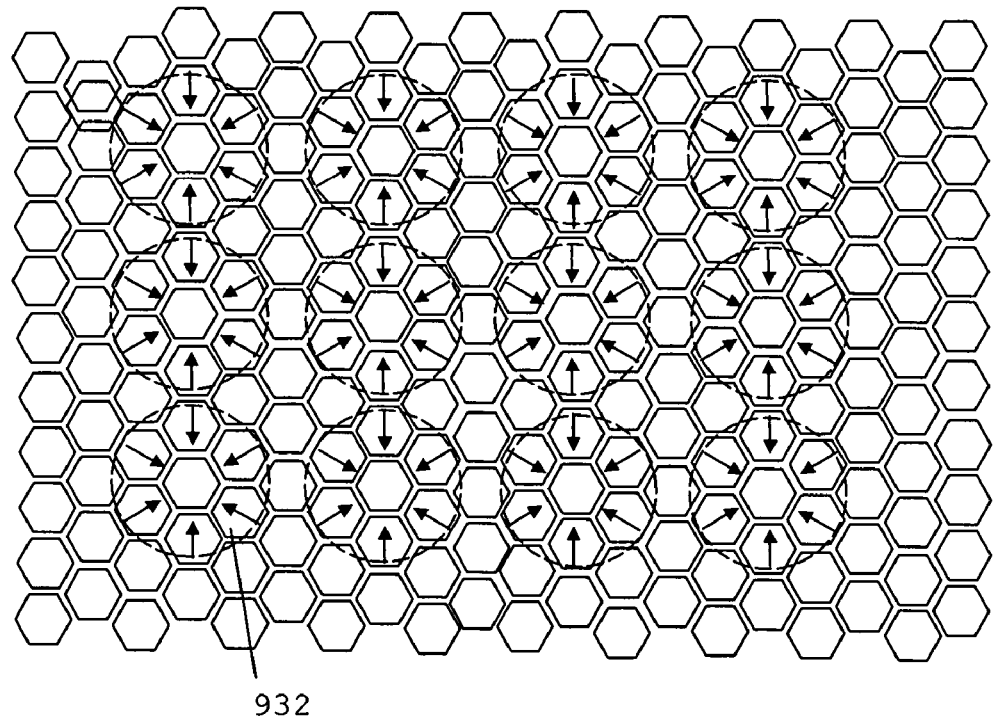
FIG. 12 is a top view of a lens array including a micromirror array lens at another point in time, according to one embodiment of the present invention.

The relative positions of the micromirror array lens 932, 934, and 936 are not fixed in the plane of the lens array 830. Each micromirror array lens exists for a given time. According to the image signal, many different micromirror array lenses are "constructed" and "destroyed" within the frame speed. For example, one image frame may only require that the lens array 830 comprise only one micromirror array lens 932, as shown in FIG. 11. However, another image frame may require that the lens array comprise twelve micromirror array lenses 932, as shown in FIG. 12. For the purposes of the present invention, the word "variable" means all optical parameters, focal length, optical axis, lens size, the number of lenses, shape of lens, and others are changed according to the processed image data.

Even a group of micromirrors, in which the micromirrors are relatively separated or spaced apart, can construct a micromirror array lens so long as each micromirror has corresponding slant and the micromirrors are configured such that phases of the converging light are the same.

Figure 13:
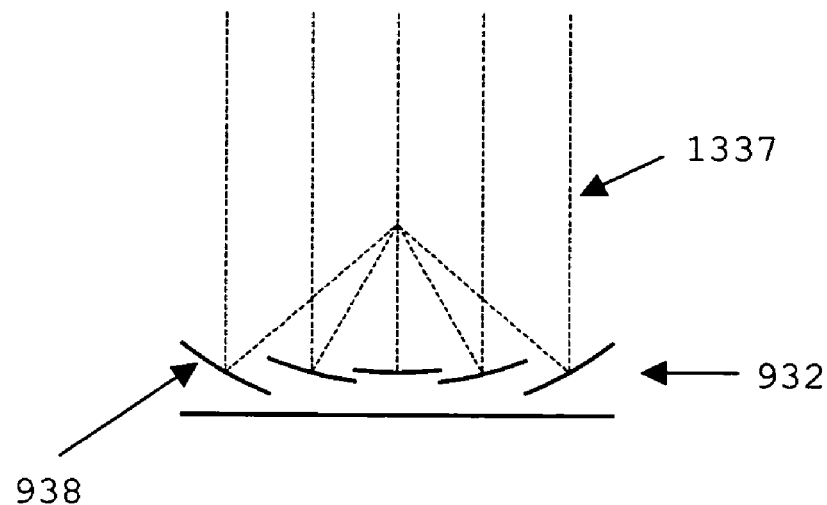
FIG. 13 is a schematic side view of a micromirror array lens, according to one embodiment of the present invention.

FIG. 13 illustrates how each micromirror array lens 932, 934, and 936 works. The micromirror array lens of the present invention is very similar to the prior art micromirror array lens proposed by J. Boyd and G. Cho in their paper entitled, "Fast-response Variable Focusing Micromirror Array Lens", *Proc. SPIE*, Vol. 5055, 278-286 (2003), the disclosure of which is hereby incorporated by reference as if set forth in full herein. As described above, the micromirror array lens 932 comprises many micromirrors 938. Each micromirror corresponds to a segment of a circle or a parabola. Unlike conventional concave mirrors, the micromirror array lens can change its focal length and direction of optical axis by controlling the slant of each segmental micromirror.

The micromirror array lens 932 produces an in-focus image pixel by converging collimated light 1337 into one point M (see FIG. 8) on an image plane. This is accomplished by controlling the position of the micromirrors 938. The phases of the arbitrary light may be adjusted to the same phase by translating each one of the micromirrors. The required translational displacement range of the micromirrors is at least half of the wavelength of light.

The focal length F of the micromirror array lens 932 is changed by controlling the rotational and/or translational motion of each micromirror 938. Because the micromirrors can have rotational and translational motion, the micromirror array lens can be a Spatial Light Modulator (SLM). The micromirrors retract or elevate to length or shorten the optical path length of light scattered from the image, to remove phase aberrations from the image.

The mechanical structures upholding the micromirrors 938 and the actuating components that rotate and translate the micromirrors are located under the micromirrors to enable the micromirrors to be positioned closer to one another. This increases the effective reflective area of the micromirror array lens 932. Also, electric circuits to operate the micromirrors can be replaced with known microelectronic technologies, such as MOS or CMOS. Applying the circuits under the micromirror array, the effective area can be increased by removing necessary area for the electrode pads and wires used to supply actuating power. Since the micromirrors are small in mass and have small moments of inertia, their positions and attitudes may be changed at rate of approximately 10 kHz. Therefore, the micromirror array lens becomes a high speed variable focusing lens having a focusing response speed of approximately 10 kHz.

As discussed above, it is desired that each micromirror 938 have a curvature because the ideal shape of a conventional reflective lens has a curvature. However, since the aberration of the micromirror array lens 932 with flat micromirrors is not much different from a conventional lens with curvature if the size of the micromirrors is small enough, there is not much need to control the curvature of the micromirrors.

One benefit of the present invention is that it improves the operational method of prior art micromirror array lenses and modifies these lenses for easy implementation with existing two-dimensional image projectors. Accordingly, referring now to FIGS. 4 and 9, the present invention provides each micromirror 938 with three degrees-of-freedom motion, one translational motion 444 along the normal axis to the plane of each micromirror array lens, and two rotational motions 442, 443 about two axes in the plane of each micromirror array lens. The translational motion is required to meet phase matching condition to compensate for aberrations. The two rotational motions are required to deflect light arbitrary direction and are essential for versatility of the array of micromirror array lenses. An array of micromirror array lenses with only two-degree-of-freedom rotational motion is also possible but its image quality may be deteriorated.

Figure 14:
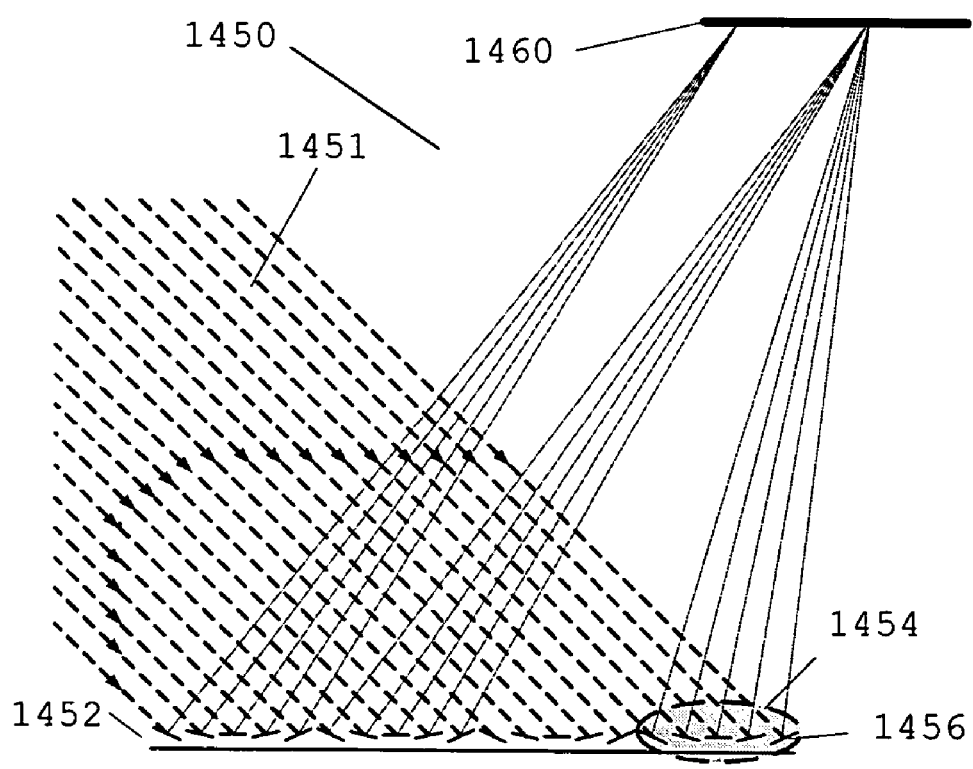
FIG. 14 is a schematic view illustrating operation of a two-dimensional projection device, according to one embodiment of the present invention.

FIG. 14 illustrates the operation of a two-dimensional image projection device 1450, such as a beam projector or a projection television, comprising a lens array 1454 in accordance with principles of the present invention. Accordingly, a light source (not shown) generates collimated light 1451 that incidents from the light source to the lens array 1452. The light is reflected from the micromirror array lenses 1456 and focused onto a projection plane 1460, wherein the resulting image is viewed.

At any given image frame, the center or optical axis of a micromirror array lens may vary. Similarly, at any given image frame, the number of micromirrors comprising a micromirror array lens, or the focal length of a micromirror array lens may vary. Since each micromirror array lens has the ability to scan the in-focused light along the projection plane, any two or more micromirror array lenses can simultaneously focus incident light onto different positions, or the same position along the projection plane. Because each micromirror array lens can scan the whole plane 1460 (i.e., focus the incident light at any position along the plane), the projected image can be generated.

Random Scanning Technique

Figure 15:
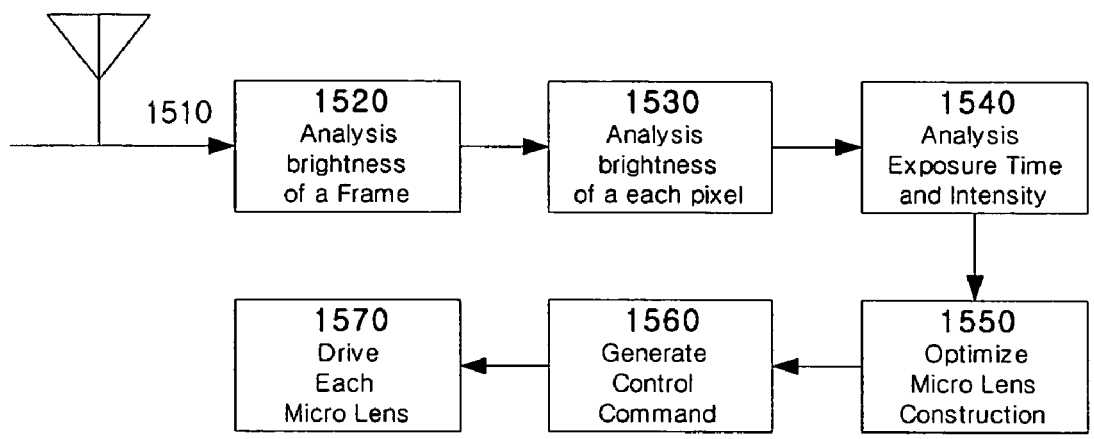
FIG. 15 is a block diagram showing a random scanning technique in a two-dimensional image projection device, according to one embodiment of the present invention.

Two-dimensional image projection devices of the present invention may apply a random scanning technique ("RST") to reduce the required number of micromirror array lenses comprising a lens array. FIG. 15 schematically illustrates how the RST is applied to such image projection devices.

The technique begins with an image signal 1510 that is received from an antenna and/or receiving means. The signal is then processed by an image processor that analyses the average brightness of a frame 1520. The image processor then analyses brightness of each pixels 1530. Next, the image processor calculates the required light intensity and exposure time 1540 for each pixel. The image processor then performs optimization 1550. Through the optimization, the most optimized set of micromirror array lens combinations which can minimize the movement, minimize construction and destruction of the micromirror array lens, and the minimize scanning length for a frame rate is generated. According to the optimized lens combinations, a control command for a frame is generated 1560. The control signal is sent to lens array to generate images on the screen. Because the response time of micromirror array lens (>10 kHz) is much faster than the frame speed (~30 Hz), a two-dimensional image projection system using array of micromirror array lenses and the random scanning technique can display much more pixels than the number of micromirror array lenses. By changing the number of micromirrors of each micromirror array lens and/or scanning speed (i.e., the duration of light exposure time) of the micromirror array lenses, the gray scale can be expressed easily. The fact that the required number of micromirror array lens is much smaller than the number of pixels makes the array of micromirror array lenses very small in size. Moreover, the display device can express fine images if the array of micromirrors comprise enough micromirrors.

Self Diagnosis & Correction Technique

Figure 16:
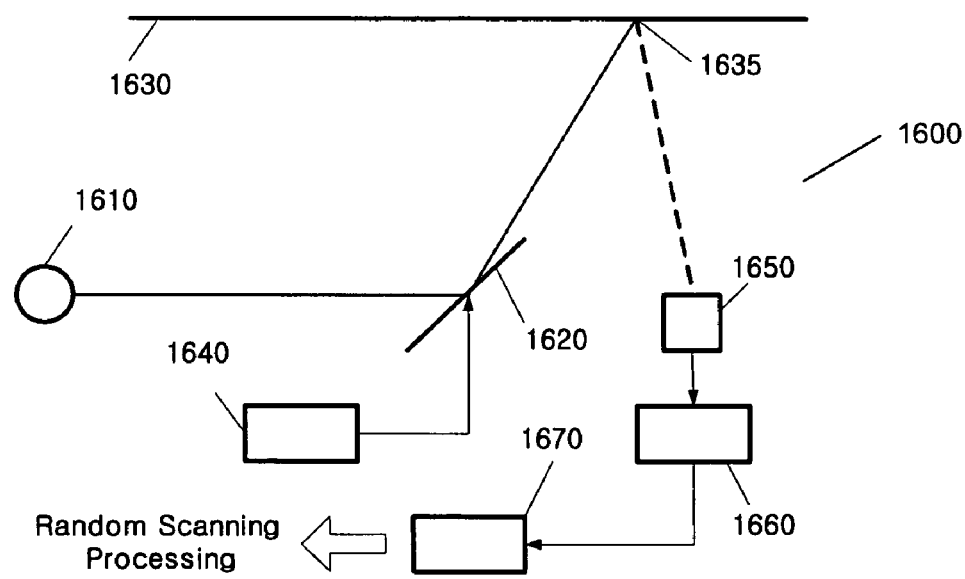
FIG. 16 is block diagram showing a self diagnosis and correction process in a two-dimensional image projection device, according to one embodiment of the present invention.

A self diagnosis & correction technique ("SDCT") may also be applied to a two-dimensional image projection device. During the SDTC, the image processor analyzes the deviations of each spot from a predetermined position and correct the scale factor of the corresponding micromirror. A simplified schematic diagram of the SDCT as applied to a two-dimensional image projection device of the present invention is shown in FIG. 16. The SDCT system mainly consists of a light source 1610, an image sensor 1650, an image processor 1660, read only memory (ROM) 1670, a lens array 1620, and controller 1640.

This technique starts with the controller 1640. The controller generates and sends a set of test signals to the lens array 1620. Each of the micromirrors comprising the array is controlled by the test signal, and incident light from the light source 1610 is deflected to several predetermined positions 1635 along a projection plane 1630 by the controlled micromirrors. The image sensor 1650 comprises a photo detector that detects the light spots along the projection plane. The image sensor then sends an electrical signal comprising image data to the image processor 1660. The image processor also decides the pass or failure of each micromirror. This test will be done for all micromirrors in the lens array. Because the response speed of the micromirrors are slightly less than 10 kHz, entire the test can be completed for all micromirrors within a few minutes. The test also can be done while viewers are watching the image device. The test results for all micromirrors in the array is written in the ROM 1670 and become reference data for the random signal processing. In the random scanning processing for two-dimensional image displaying, the failed micromirrors are excluded in construction of micromirror array lenses.

Through the self diagnose process, failed micromirrors are identified. The random signal processor optimizes the control signals to exclude failed micromirrors in operation and to compensate by adjusting the micromirror array lens combination and scanning speed. By the SDCT, the displayed image can be maintained with the same quality even if as many as ten to twenty percent (10~20%) of micromirrors are failed. By applying SDCT, the reliability and operating lifetime of display device can be much improved.

When applying the present invention to a conventional two-dimensional display devices, the brightness of the projected image and power consumption of the display device are greatly improved by increasing light efficiency over prior art display devices. According to the prior art, the DMD array uses at most fifty percent (50%) of incident light because it has "on" and "off" positions. The light is dumped when the mirror is at "off" position. On the contrary, the array of micromirror array lenses can use most incident light by adopting the optimized Random Scanning Technique, discussed above. In that regard, the most power consuming element in a two-dimensional display device is projection lamp, and light efficiency is directly related to power consumption.

Another prospective application of present invention is a portable two-dimensional image projector, where the array of micromirror array lenses is incorporated into small electronic devices such as mobile phones, PDAs, camcorders, and other related devices. As mentioned above, the micromirror array lenses may be small in construction, which enables the array to be used with such devices.

Figure 17:
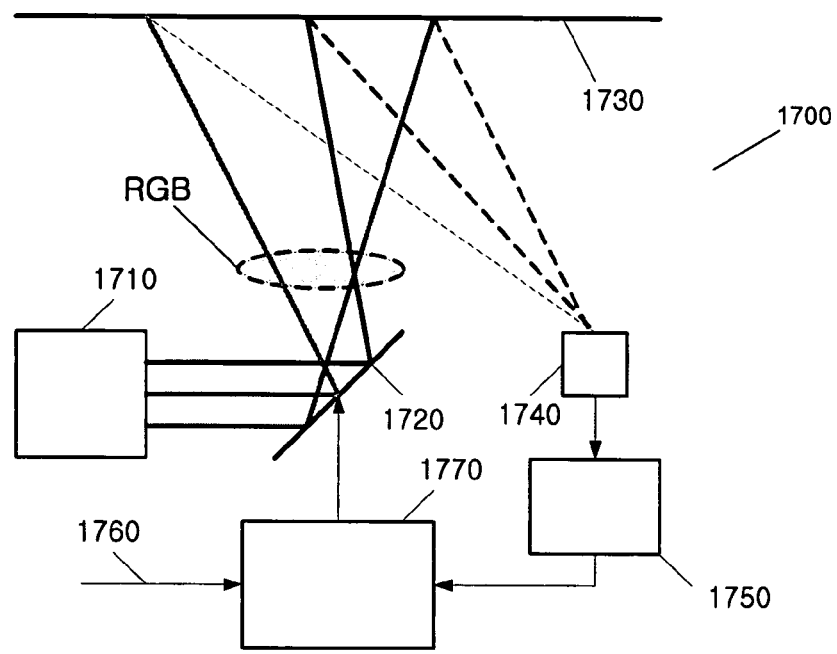
FIG. 17 is a schematic diagram showing a portable electronic device including a lens array, according to one embodiment of the present invention.

FIG. 17 illustrates an example of a two-dimensional image projector of the present invention implemented within a small portable electronic device. In this embodiment, to miniaturize the two-dimensional image projector, a three (Red, Green, Blue) laser diode module 1710 is used as a light source. To minimize undesirable effects, such as speckle and interference from coherent light, a broad band laser is preferable. An image signal 1760 received from a broadcasting system, other outside device, or internal storage device is transmitted to a random scanning processing unit 1770, which sends an optimized control signal to construct a lens array 1720. The lens array deflects incident light from the laser diode to display an image. The image can be displayed on a screen, wall, or other suitable projection plane 1730. An image sensor 1740 implemented into the portable electronic device, comprises a photo detector that detects scattered light from the screen. The image sensor generates and sends to an automatic focusing image processor 1750 an electrical signal carrying image data. The image processor contains an automatic focusing algorithm that analyzes the image data to determine the focusing status. The image processor then sends the focusing status to a random scanning processing unit 1770. Random scanning processing unit sends a control signal to the micromirror array lenses to adjust the focusing of each of the micromirror lenses in the lens array.

In sum, the present invention improves the brightness and power consumption of conventional two-dimensional image projection systems. The present invention may be adapted to provide portable, pocked-sized, high quality two-dimensional image projection devices. Each of the micromirror array lenses comprising the lens array of the present invention may be controlled independently to have different focal lengths, different optical axes, lens sizes, and lens shapes.

This enables the lens array to be applied in many applications. Further, each of the micromirror array lenses of the lens array may be controlled to scan a plane with different speeds, or a group of micromirror array lenses may be controlled to scan the same point on a plane simultaneously. This makes easy to control the light intensity on the screen.

In another embodiment of the present invention there is provided an optical pick-up device for use in an optical recording/reproducing system. The optical pick-up device comprises at least one variable focal length micromirror array lens. The micromirror array lens records and/or reads information on or from an optical disc. The present invention provides focusing, tracking, and tilt compensation of the optical pick-up with minimal macroscopic motion.

Figure 18:
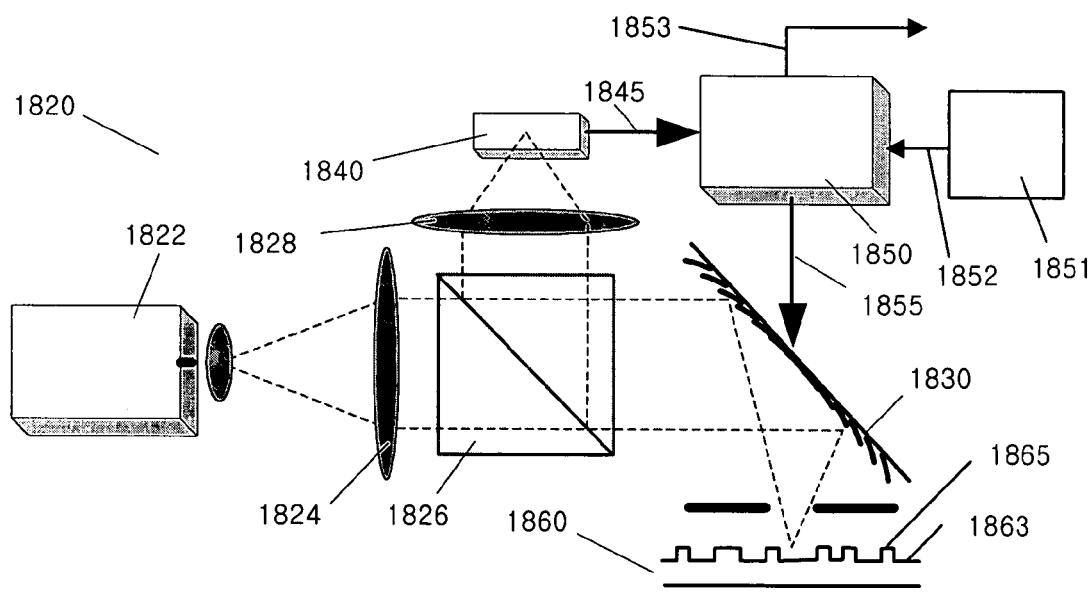
FIG. 18 is a schematic view of an optical pick-up device in accordance, according to one embodiment of the present invention.

While aspects of the present invention are applicable to a variety of optical pick-up devices, a representative example of an optical pick-up device 1820 to which embodiments of the present invention are applied is shown in FIG. 18. As shown in FIG. 18, the optical pick-up device 1820 includes a laser diode 1822, a first optical lens 1824, a beam splitter 1826, a second optical lens 1828, a micromirror array lens 1830, a sensor 1840, a tilt detector 1851 and a signal processor 1850. The foregoing components are preferable packaged as a single unit within the device. However, various components of the device, such as the signal processor, may be remote or detachable from the device.

The first and second optical lenses 1824 and 1828 are preferably conventional refractive lenses having fixed focal lengths. As illustrated in FIG. 18, the laser diode 1822 emits a laser beam that passes through the first optical lens 1824. The first optical lens created a collimated light beam which is passed to the beam splitter 1826. The collimated beam passed to the beam splitter 1826 is then focused onto a signal recording surface of an optical disc 1860 by the micromirror array lens 1830. The optical disc reflects a portion of the light beam back towards the micromirror array lens. The reflected light is collimated by the micromirror array lens and deflected substantially 90°, towards the beam splitter. The beam splitter deflects the reflected light substantially 90°, towards the second optical lens 1828. The second optical lens focuses the reflected beam on the sensor 1840.

As discussed above, the light passed through the first optical lens 1824 is passed to the micromirror array lens 1830. The micromirror array lens 1830 is a variable focal length lens. Such a micromirror array lens was proposed by James G. Boyd IV and Gyoungil Cho in their paper entitled, "Fast-response Variable Focusing Micromirror Array Lens", *Proc. SPIE*, Vol. 5055, pp. 278-286 (2003), and improvements of the micromirror array lens are disclosed in U.S. patent application Ser. No. 10/806,299 (filed Mar. 23, 2004), Ser. No. 10/855,554 (filed May 27, 2004), Ser. No. 10/855,715 (filed May 27, 2004), Ser. No. 10/855,287 (filed May 27, 2004), Ser. No. 10/857,796 (filed May 28, 2004), Ser. No. 10/857,280 (filed May 28, 2004), and Ser. No. 10/857,714 (filed May 28, 2004), the entire disclosures of which are incorporated herein by reference.

Referring now to FIGS. 2 and 18, the micromirror array lens 1830 preferably comprises a plurality of micromirrors 222 concentrically arranged in a plane to form one or more concentric circles. However, the shape and the arrangement of each micromirror may be varied according to the shapes and the objectives of the micromirror array lens. The micromirrors 222 have the same function as a mirror and comprise a reflective surface made of metal, metal compound, or other materials with high reflectivity. Many known microfabrication processes may be used to make the surface have high reflectivity.

The micromirrors preferably comprise a parabolic cross-section and have a fan shape. This fan-shaped construction with curvature increase the effective reflective area and focusing efficiency of the micromirror array lens. In other embodiments, the reflective surface of the micromirrors may be flat.

The micromirrors 222 are individually controlled electrostatically and/or electromagnetically by actuating components that rotate and translate the micromirrors. The micromirrors are controlled to change the focal length of a micromirror array lens 1830 by controlling their translational and/or rotational motions. The mechanical structures upholding the micromirrors 222 and the actuating components that rotate and translate the micromirrors are located under the micromirrors to enable the micromirrors to be positioned closer to one another. The close positioning of the micromirrors increases the effective reflective area of the micromirror array lens.

Referring now to FIGS. 2 and 4, each micromirror 222 has three degrees-of-freedom motion, one translational motion 444 along the normal axis to the plane of each micromirror array lens, and two rotational motions 442 and 443 about two axes in the plane of each micromirror array lens. The translational motion is required to meet phase matching condition to compensate for aberrations. The two rotational motions are required to deflect light arbitrary direction and are essential for versatility of the array of micromirror array lenses.

FIGS. 19(*a*)-19(*b*) illustrate the principle of a micromirror array lens and the analogy between a micromirror array lens 1830 and a conventional concave mirror 1935. It is well known that a concave mirror functions as a convex refractive lens. The micromirror array lens is effectively a type of reflective Frensel lens. As shown in FIG. 2, a micromirror array lens comprises a plurality of micromirrors 222. Unlike the conventional concave mirror, the micromirror array lens can change its focal length by controlling the rotational and/or translational motion of micromirrors.

In that regard, the micromirror array lens converges arbitrarily scattered light 1934 onto a focal point F by controlling the positions of the micromirrors 222 (see FIG. 2). The phases of the arbitrary light may be adjusted to be the same by translating each one of the micromirrors. The required translational displacement range of the micromirrors is at least half of the wavelength of light. The focal length of the micromirror array lens 1830 is changed by controlling the rotational and/or translational motion of each micromirror.

Therefore, by controlling each micromirror independently, the lens can correct defect and aberration which are caused by various optical effects such as optical tilt, mechanical deflection, and so on. The micromirrors can correct the phase error of light scattered from the disc to remove phase aberration by controlling the amounts of their translations.

The lens also has a high optical focusing efficiency and can have a large size aperture without losing optical performance. The lens has low production cost because of the advantages of its mass productivity typical of microfabrication methods. The lens can also make the focusing system much simpler due to its simple structure.

Referring now back to FIG. 18, the sensor 1840 comprises a photo detector. The photo detector converts photon energy of the light reflected by the optical storage media 1860 into electric signal, in the form of an electrical data signal 1845. The senor then sends the generated data signal to the signal processor 1850 for processing. The sensor may be a coupled charge device (CCD), a CMOS image sensor, or any other suitable alternative.

In other embodiments, the sensor may comprise one or more photo detectors for detecting focus error and tracking error signals.

The signal processor 1850 is preferably a processing unit comprised within or detachable from the optical pick-up device 1820. The signal processor uses an algorithm to analyze the data signal from the sensor 1840. One of various well-known conventional signal processing algorithms can be used depending on the application. The tilt detector 1851 measures the tilt of the optical disc. The measured tilt is sent to the signal processor 1850. The signal processor processes the data signal received from the senor and the tilt detector and generates a reproduction or RF signal 1853 corresponding the recorded information on the optical disc, and controls signals 1855 which are sent to micromirror array lens to compensate for correct tracking error, focusing error, and tilt error.

FIGS. 20(*a*)-20(*b*) are schematic side views illustrating an example of the operation of a micromirror array lens to perform phase compensation in compensating for the tilt of an optical disc. It shall be understood that the movement of the micromirrors can compensate for differences in phase for any device application and compensating for tilt and deflection of the optical disc 1860 is only one example. Phase compensation may be performed for any focusing or scanning operation.

Referring again to FIGS. 20(*a*)-20(*b*), when a tilt and/or mechanical deflection of a disc 1860 occur, the micromirror array lens 1830 maintains the focus at the point P on the disc by changing its focal length and optical axis. In addition, the micromirror array lens 1830 can also correct various aberrations because the lens is an adaptive optical lens. Thus, with no macroscopic motions, the lens can compensate for a focusing error, a tracking error, and aberration by tilt and/or mechanical deflection.

FIG. 18 illustrates how optical pick-up devices of the present invention reads data from an optical disc 1860. The laser diode 1822 emits a laser beam which is passed through the first optical lens 1824. The first optical lens collimates the light beam. The light beam is then passed to the beam splitter 1826. The light is passed from the beam splitter to the micromirror array lens 1830. The micromirror array lens deflect the light beam substantially 90°, and focuses the light on a tracking location on a data layer of the optical disc 1860. Light reflected from a reflective layer of the optical disc is collimated by the micromirror array-lens 1830, and deflected back towards the beam splitter 1826. The beam splitter then deflects the reflected light substantially 90°, towards the second optical lens 1828. The second optical lens passes the reflected light and focuses it on the sensor 1840. The sensor detects the intensity of the reflected light from the reflective layer of the optical disc, and generates an electrical signal 1845 based on the intensity of light it receives. In that regard, the reflected light is more diffused, or has a weak intensity when it hits a pit 1863 in the data layer. The reflected light has a strong intensity when it strikes the smooth areas, or lands 1865, in between the pits. The data signal is generated by pits and lands.

The electrical signal is passed to the signal processor 1850. The signal processor generates a reproduction signal 1853. The signal processor also generates control data 1855 which is sent to the micromirror array lens to adjust the micromirrors to compensate for tracking error, focusing error, and tilt error.

Similarly, optical pick-up devices of the present invention are capable of writing data onto the optical disc 1860. In that regard, the intensity of the laser beam emitted by the laser diode 1822 is varied according to a data signal transmitted to the laser diode via a data storage device (not shown) within the optical recording/reproducing system. The laser beam is passed through the first optical lens 1824. The first optical lens collimates the light beam. The light beam is then passed to the beam splitter 1826. The light is passed from the beam splitter to the micromirror array lens 1830. The micromirror array lens deflect the light beam substantially 90°, and focuses the light on the dye layer of the optical disc 1860. Depending on the intensity of the laser beam, the dye used to form the optical disc reacts to the heat and light to create a series of recorded pits and lands corresponding the stored data.

When an optical disc is titled in an optical disc drive, the signal quality of a recording signal and/or reproduced signal of the optical disc may be lowered. In order to correct the tilt of the optical disc, the optical pick-up device may comprise a tilt detector 1851, as shown in FIG. 18. The tile detector detects the tilt of the optical disc and generates a tilt signal 1852 in response to the detected tilt. The tilt signal is transmitted to the signal processor 1850. The signal processor processes the tilt signal and transmits a control signal 1855 to the micromirror array lens to compensate for tilt error.

In the typical optical pick-up device, a magnetically driven conventional lens has both focusing and tracking motions to record information on a disc or to read the recorded information from the disc. In a more advanced device, a conventional lens is moved macroscopically in one or more directions to compensate for the optical tilt, which results in comma aberration. However, in optical pick-up devices of the present invention, the micromirror array lens 1830 can cover the focusing, tracking, and tilt compensation operations of a conventional lens without macroscopic motions. This possible because the micromirror array lens is a variable focal length lens, capable of changing optical axis and compensating for aberrations by the microscopic three-degree-of-freedom motions of each micromirror. By replacing the magnetically driven conventional lens with a micromirror array lens, a much simpler configuration can be achieved by reducing the number of moving parts.

Figure 21:
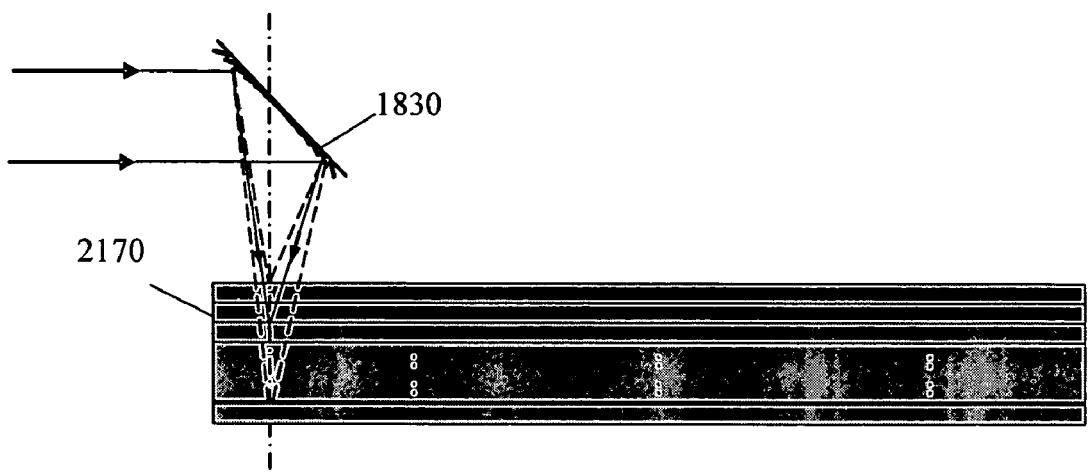
FIG. 21 is a schematic side view illustrating operation of a micromirror array lens to record data on or read data from a multi-layered optical disk, according to one embodiment of the present invention.

As shown in FIG. 21, micromirror array lenses 1830 of the present invention are capable of recording data on and reading data from a multi-layered optical disc 2170. In this instance, the micromirror array lens records and/or reads information at each layer of a multi-layered optical disk by changing its focal length to focus on the desired layer.

Figure 22:
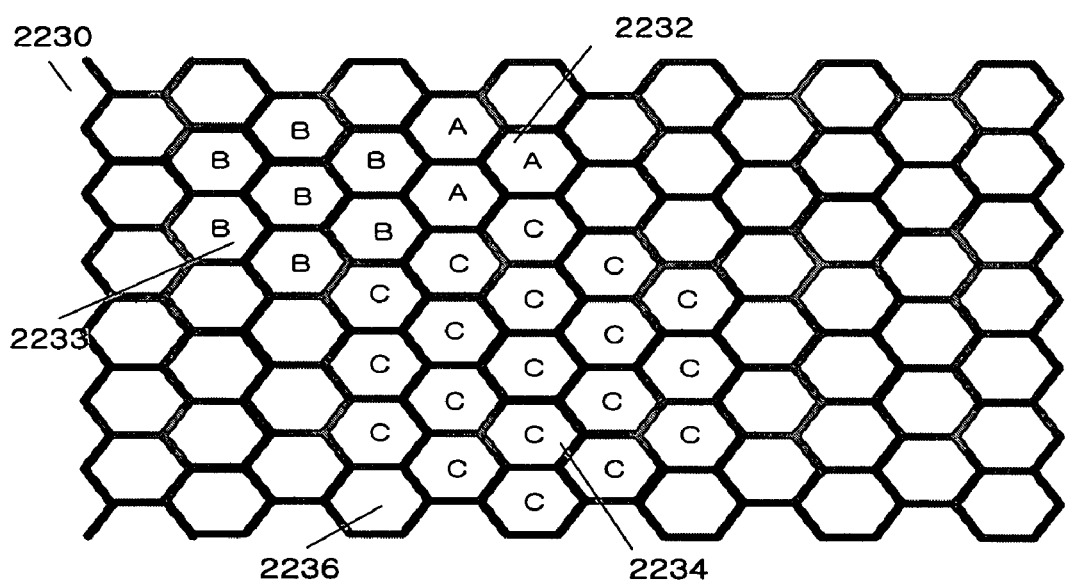
FIG. 22 a schematic top view of an micromirror array including multiple micromirror array lenses, according to one embodiment of the present invention.
Figure 23:
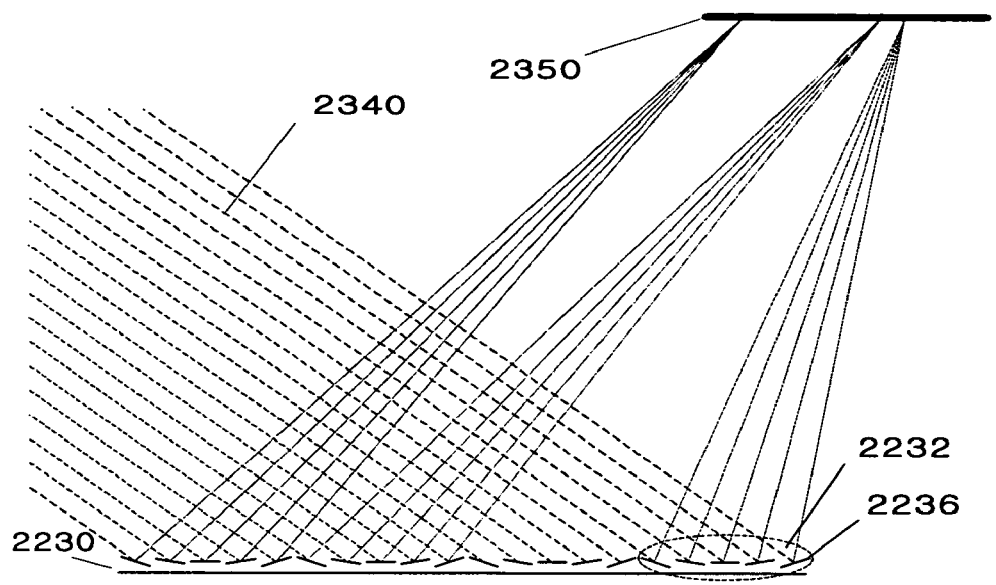
FIG. 23 is a schematic side view of a portion of an optical pick-up device including a lens array having multiple micromirror array lenses, according to one embodiment of the present invention.

In other embodiments of the present invention, as shown in FIGS. 22 and 23, the optical pick-up device may comprise a planar array 2230 of micromirror array lenses 2232, 2233, 2234 with different shapes, sizes, and numbers of micromirrors 2236. Such an array of micromirror array lenses is disclosed in U.S. patent application Ser. No. 10/857,714 (filed May 28, 2004), the disclosure of which is hereby incorporated by reference as if set forth in full herein.

Accordingly, the position of each micromirror array lens is not fixed in the plane and many different micromirror array lenses 2232, 2233, 2234 can be "created" and "deleted". In addition to all the optical parameters such as the focal length, optical axis, lens size, the number of micromirrors, and others of each micromirror array lens, the total number of lenses comprising the array is variable according to the purpose of the array.

The micromirror array lenses are not limited to the configuration shown in FIG. 22. The micromirrors can have arbitrary shapes and sizes, and form a lens with arbitrary shape and size or an array of micromirror array lenses. Even though only the hexagonal shape is shown in FIG. 22, the micromirrors can have different shapes to form different types of lens arrays without losing their effective reflective area. In order to increase the effective reflective area, the control circuitry of the lens can be constructed by known microelectronics technology which is located under the mirrors.

As shown in FIG. 23, each micromirror array lens 2232 can have a different optical axis, different number of micromirrors 2236, and different focal length. Since each micromirror array lens 2232 also can freely change its optical axis and focal length with three-degree-of-freedom motions of its micromirrors, each micromirror array lens causes incident light 2340 to focus at any position in a plane 2350 or scan the whole plane.

Figure 24:
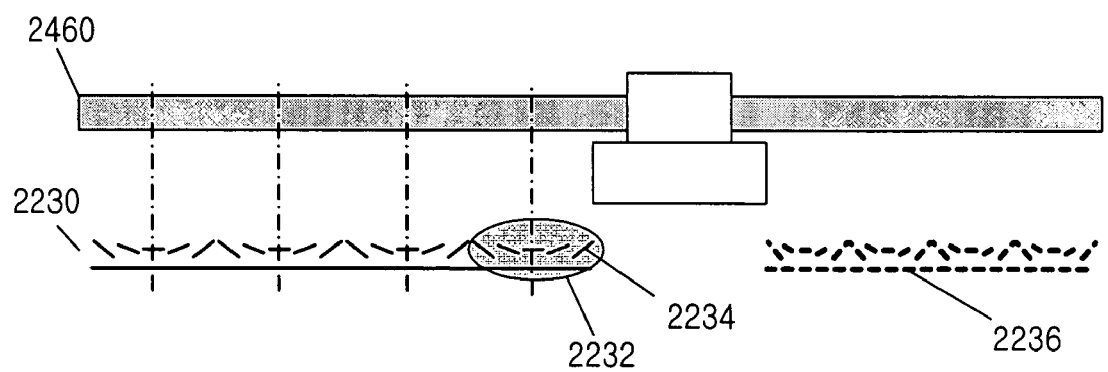
FIG. 24 is a schematic side view of a high-speed optical pick-up device including a lens array having multiple micromirror array lenses, according to one embodiment of the present invention.

FIG. 24 shows a high-speed optical pick-up device of the present invention with a planar array 2230 of micromirror array lenses 2232. As mentioned above, the micromirror array lens can cover the focusing, tracking, and/or tilt compensation operational motions of a conventional optical pick-up device. In this embodiment, macroscopic motion is only needed for the tracking operation of the device using the micromirror array lens. However, if the array 2230 is set to cover the whole radial region of a disc 2460, even the tracking operation will be covered and then there will be no macroscopic motions in the optical pick-up device. Since each lens of the lens array can change its focal length and optical axis very fast by controlling each of their micromirrors 2234, each lens is only required to scan its assigned region of the disc without any macroscopic motion and is much faster than a micromirror array lens with tracking operations. In addition, the system can be sped up as more lenses 2232 are added to the array in the radial direction.

Thus, if an array of micromirror array lenses is applied to the system, all macroscopic motions including tracking motion are no longer needed. The optical recording/reproducing system can improve its reliability and reading/writing speed with high optical focusing efficiency by removing moving parts in the optical pick-up device.

At present, there exist many kinds of optical information recording media, and the standards of these optical information recording media are established. Because the optical information recording media have different recording densities, interchangeability between CD and DVD is required. These optical information recording media have different thicknesses of the transparent base board. In order to obtain the interchangeability, it is necessary to correct a spherical aberration generated by the difference of the thickness of the transparent base boards. The spherical aberration can be compensated by controlling the rotations and/or translations of micromirrors.

A lens array is an array of lenses. A micromirror array is an array of micromirrors. A micromirror array lens is a lens composed of an array of micromirrors. A micromirror array lens is composed of at least one micromirror. Operation of at least one micromirror may be considered operation of a micromirror array lens. Within a micromirror array lens, each micromirror may be moved independently by its respective actuating component.

The advantages of the present invention include high speed variable focusing and scanning, large focal length variation, phase compensation, high reliability and optical efficiency, low power consumption and low cost.

While the invention has been shown and described with reference to different embodiments thereof, it will be appreciated by those skills in the art that variations in form, detail, compositions and operation may be made without departing from the spirit and scope of the invention as defined by the accompanying claims.

What is claimed is:

1. An optical system, comprising:
    at least one light source configured to emit light;
    a micromirror array lens comprising a plurality of micromirrors, optically coupled to the light source, configured to focus the light onto a projection medium and to scan the in-focused light onto the projection medium wherein each micromirror in the micromirror array lens has one degree of freedom translation and two degrees of freedom rotation; and
    at least one actuating component coupled to the micromirror in the micromirror array lens, and configured to control movement of the micromirror in order that the micromirror array lens focuses the light on the projection medium and scans the in-focused light onto the projection medium.

2. The optical system of claim 1, wherein movement of the micromirror by the actuating component is configured to scan the projection medium by traversing the light focused by the micromirror array lens across the projection medium.

3. The optical system of claim 2, wherein the scan of the projection medium is configured to allow data to be recorded to the projection medium.

4. The optical system of claim 1, wherein movement of the micromirror by the actuating component is configured to compensate for light phase aberrations while focusing the input light.

5. The optical system of claim 1, further comprising:
    a control circuitry coupled to the actuating component, configured to control movement of the micromirror by the actuating component.

6. The optical system of claim 5, wherein the control circuitry comprises semiconductor microelectronics.

7. The optical system of claim 1, wherein the movement of the micromirror by the actuating component is controlled by at least one of the group consisting of;
    electrostatic force; and
    electromagnetic force.

8. The optical system of claim 1, further comprising:
    a read sensor coupled to the micromirror array lens, configured to read data from the projection medium in response to a scan of the projection medium by traversing the light focused by the micromirror array lens across the projection medium.

9. The optical system of claim 8, wherein movement of the micromirror by the actuating component is configured to compensate for light phase aberrations.

10. An optical system, comprising:
    at least one light source configured to emit light;
    a micromirror array lens comprising a plurality of micromirrors, optically coupled to the light source, configured to focus the light onto a projection medium and to scan the in-focused light onto the projection medium wherein each micromirror in the micromirror array lens has one degree of freedom translation and two degrees of freedom rotation;
    at least one actuating component coupled to the micromirror of the micromirror array lens, and configured to control movement of the micromirror in order that the micromirror array lens focuses the light on the projection medium and scans the in-focused light onto the projection medium; and a read sensor coupled to the micromirror array lens, configured to read data front the projection medium in response to the scan of the projection medium by traversing the light focused by the micromirror array lens across the projection medium.

11. The optical system of claim 10, wherein movement of the micromirror by the actuating component is configured to compensate for light phase aberrations.

12. A method in an optical system, comprising:

emitting light from a light source onto a micromirror array lens;

adjusting a position of each micromirror in the micromirror array lens to focus the light onto a projection medium and to scan the in-focused light onto the projection medium, wherein each micromirror in the micromirror array lens has one degree of freedom translation and two degrees of freedom rotation.

13. The method of claim 12, further comprising:

adjusting the position of the micromirror in the micromirror array lens to compensate for light phase aberrations white focusing the input light.

14. The method of claim 12, further comprising; recording data in the projection medium in response to the scanning of the projection medium.

15. The method of claim 12, further comprising:

sensing light reflected from the projection medium in response to the light focused by the micromirror array lens; and reading data from the projection medium in response to the sensing of the light reflected from the projection medium.

16. The method of claim 12, further comprising:

adjusting the position of the micromirror in the micromirror array lens to compensate for light phase aberrations while focusing the input light.

* * * * *